United States Patent
Kaneko et al.

(10) Patent No.: US 9,627,692 B2
(45) Date of Patent: Apr. 18, 2017

(54) CARBON-SUPPORTED CATALYST

(71) Applicant: TOYOTA JIDOSHA KABUSHIKI KAISHA, Toyota-shi, Aichi-ken (JP)

(72) Inventors: Keiichi Kaneko, Mishima (JP); Naoki Takehiro, Shizuoka-ken (JP); Norimitsu Takeuchi, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 15/117,532

(22) PCT Filed: Jan. 6, 2015

(86) PCT No.: PCT/JP2015/050172
§ 371 (c)(1),
(2) Date: Aug. 9, 2016

(87) PCT Pub. No.: WO2015/122207
PCT Pub. Date: Aug. 20, 2015

(65) Prior Publication Data
US 2016/0344038 A1    Nov. 24, 2016

(30) Foreign Application Priority Data
Feb. 14, 2014   (JP) ................. 2014-027019

(51) Int. Cl.
*H01M 4/92*  (2006.01)
*H01M 4/86*  (2006.01)

(52) U.S. Cl.
CPC ......... *H01M 4/926* (2013.01); *H01M 4/8657* (2013.01); *H01M 4/921* (2013.01)

(58) Field of Classification Search
None
See application file for complete search history.

(56) References Cited

U.S. PATENT DOCUMENTS

| | | |
|---|---|---|
| 2006/0134505 A1 | 6/2006 | Wang et al. |
| 2007/0031722 A1 | 2/2007 | Adzic et al. |

(Continued)

FOREIGN PATENT DOCUMENTS

| | | |
|---|---|---|
| CA | 2776367 A1 | 1/2012 |
| CN | 103079696 A | 5/2013 |

(Continued)

*Primary Examiner* — Miriam Stagg
*Assistant Examiner* — Wojciech Haske
(74) *Attorney, Agent, or Firm* — Andrews Kurth Kenyon LLP

(57) ABSTRACT

The present invention is to provide such a carbon-supported catalyst that an activity expected from a catalytic activity by rotating disk electrode (RDE) evaluation is maintained even after the formation of a membrane electrode assembly (MEA). Disclosed is a carbon-supported catalyst wherein the carbon-supported catalyst includes fine catalyst particles that have a palladium-containing particle and a platinum-containing outermost layer covering at least part of the palladium-containing particle, and a carbon support supporting the fine catalyst particles, and wherein, in a cyclic voltammogram that is obtained by measuring, in an acid solution, the carbon-supported catalyst applied to a measurement electrode made of an electroconductive material, the proportion of the area of a hydrogen adsorption region that appears in a reduction current region to the total area of the hydrogen adsorption region and a hydrogen occlusion region that appears in the reduction current region, is 29% to 36%.

2 Claims, 8 Drawing Sheets

(56) References Cited

U.S. PATENT DOCUMENTS

| | | | |
|---|---|---|---|
| 2012/0208105 A1* | 8/2012 | Arai | H01M 4/926 429/524 |
| 2013/0177838 A1 | 7/2013 | Wang et al. | |
| 2014/0024524 A1 | 1/2014 | Roh et al. | |
| 2014/0178575 A1* | 6/2014 | Iio | H01M 4/92 427/115 |
| 2016/0126560 A1 | 5/2016 | Maruyama et al. | |

FOREIGN PATENT DOCUMENTS

| | | | |
|---|---|---|---|
| CN | 103537280 A | 1/2014 | |
| JP | 2003-109615 A | 4/2003 | |
| JP | 2007-115637 A | 5/2007 | |
| JP | 2010-214330 A | 9/2010 | |
| JP | 2011-218278 A | 11/2011 | |
| JP | 2012-120949 A | 6/2012 | |
| JP | WO 2012105107 A1 * | 8/2012 | H01M 4/92 |
| JP | 2013-139638 A | 7/2013 | |
| JP | 2013-536065 A | 9/2013 | |
| JP | 2013-215701 A | 10/2013 | |
| JP | 2014-229516 A | 12/2014 | |
| JP | 2014-239033 A | 12/2014 | |
| KR | 20140010772 A | 1/2014 | |
| WO | 2014/073114 A1 | 5/2014 | |

\* cited by examiner

CARBON-SUPPORTED CATALYST

CROSS-REFERENCE TO RELATED APPLICATIONS

This is a national phase application based on the PCT International Patent Application No. PCT/JP2015/050172 filed Jan. 6, 2015, claiming priority to Japanese Patent Application No. 2014-027019 filed Feb. 14, 2014, the entire contents of both of which are incorporated herein by reference.

TECHNICAL FIELD

The present invention relates to a carbon-supported catalyst with better catalytic performance than ever before.

BACKGROUND ART

As an electrode catalyst for the anode and cathode of a fuel cell, a technique relating to fine catalyst particles is known, which has a structure that includes a core particle and an outermost layer covering the core particle (so-called "core-shell structure"). For the fine catalyst particles, the cost of the inside of the particles, which hardly participates in a catalyst reaction, can be reduced by the use of a relatively inexpensive material for the core particle.

In Patent Document 1, a method for producing carbon-supported, core-shell type fine catalyst particles that have a core containing palladium and a platinum shell covering the core, is disclosed.

CITATION LIST

Patent Document 1: Japanese Patent Application Laid-Open No. 2011-218278

SUMMARY OF INVENTION

Technical Problem

As a method for measuring the oxygen reduction reaction (ORR) activity of a core-shell catalyst as disclosed in Patent Document 1, a measurement method that uses a solution-phase half-cell including a rotating disk electrode (RDE) is generally known. However, according to the research made by the inventors of the present invention, in the case of a core-shell catalyst in which palladium is contained in the core and platinum is contained in the shell, even in the case where the catalytic activity obtained by evaluation using the RDE (hereinafter the activity may be referred to as RDE activity) is high, the catalytic activity at the time of evaluating current-voltage characteristics (IV characteristics) in a gas phase using an membrane electrode assembly (MEA) including the core-shell catalyst (hereinafter it may be referred to as MEA activity) can be low. Therefore, conventional core-shell catalysts do not always ensure excellent MEA activity, even if they are excellent in RDE activity.

The present invention was achieved in light of the above circumstance. An object of the present invention is to provide a carbon-supported catalyst configured to be able to maintain the activity which is expected from the RDE activity even after the formation of the MEA.

Solution to Problem

The carbon-supported catalyst of the present invention is a carbon-supported catalyst wherein the carbon-supported catalyst includes fine catalyst particles that have a palladium-containing particle and a platinum-containing outermost layer covering at least part of the palladium-containing particle, and a carbon support supporting the fine catalyst particles, and wherein, in a cyclic voltammogram that is obtained by measuring, in an acid solution, the carbon-supported catalyst applied to a measurement electrode made of an electroconductive material, the proportion of the area of a hydrogen adsorption region that appears in a reduction current region to the total area of the hydrogen adsorption region and a hydrogen occlusion region that appears in the reduction current region, is 29% to 36%.

In the present invention, preferably, the cyclic voltammogram is obtained by cyclic voltammetry under conditions that the sweep rate is 50 mV/s and the acid solution has a temperature of 25° C. and is a 0.1 M perchloric acid aqueous solution subjected to inert gas bubbling.

In the present invention, preferably, the fine catalyst particles have an average particle diameter of 3 nm or more and 10 nm or less.

Advantageous Effects of Invention

According to the present invention, in the reduction current region of the cyclic voltammogram for the carbon-supported catalyst, the proportion of the area of the hydrogen adsorption region to the total area of the hydrogen adsorption region and the hydrogen occlusion region is in the specified range; therefore, the amount of the palladium exposed on the fine catalyst particle surface can be minimized and, as a result, sufficiently high RDE activity can be obtained. Moreover, an MEA using the carbon-supported catalyst can obtain excellent MEA activity that is expected from the RDE activity, and sufficiently high ECSA can be obtained.

DESCRIPTION OF EMBODIMENTS

Figure 1:
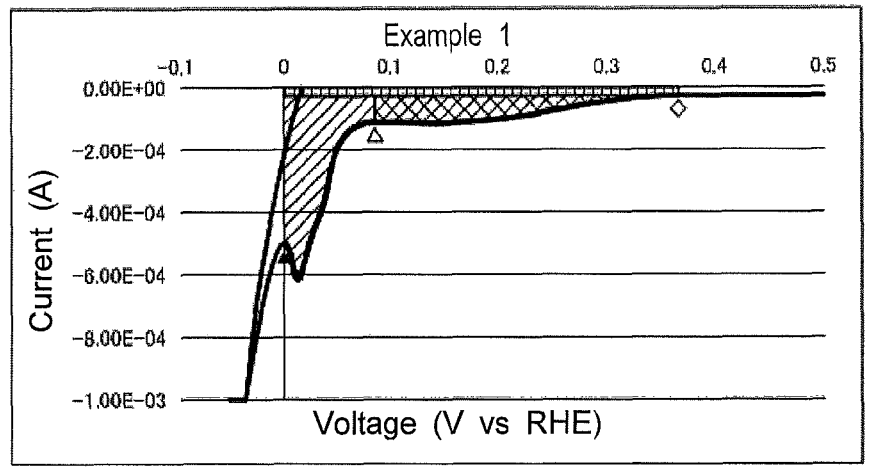
FIG. 1 is a graph showing the reduction current region of the CV of the carbon-supported catalyst of Example 1 and a hydrogen adsorption region and a hydrogen occlusion region in the reduction current region.
Figure 2:
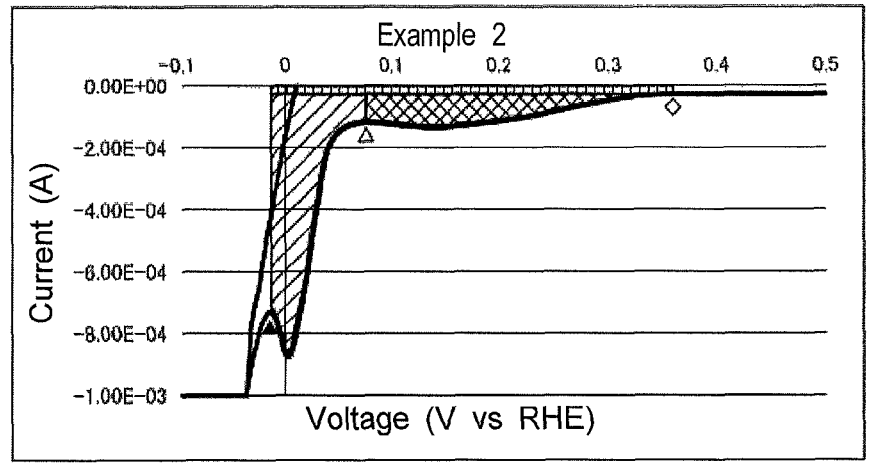
FIG. 2 is a graph showing the reduction current region of the CV of the carbon-supported catalyst of Example 2 and a hydrogen adsorption region and a hydrogen occlusion region in the reduction current region.
Figure 3:
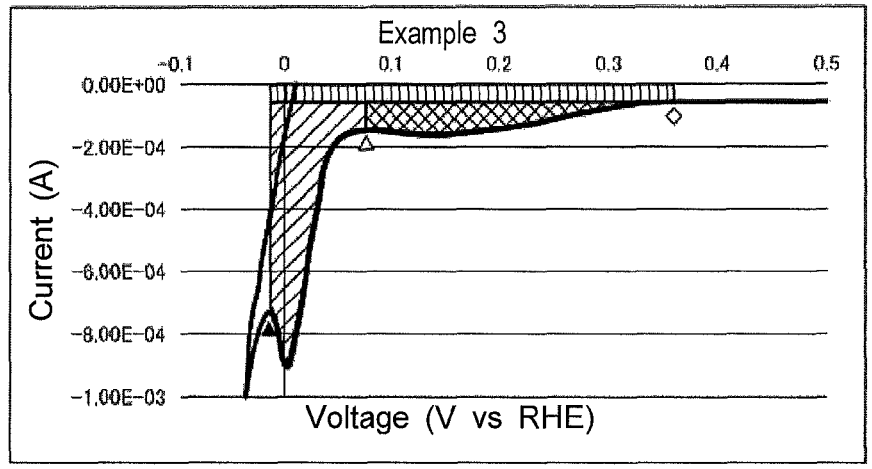
FIG. 3 is a graph showing the reduction current region of the CV of the carbon-supported catalyst of Example 3 and a hydrogen adsorption region and a hydrogen occlusion region in the reduction current region.
Figure 4:
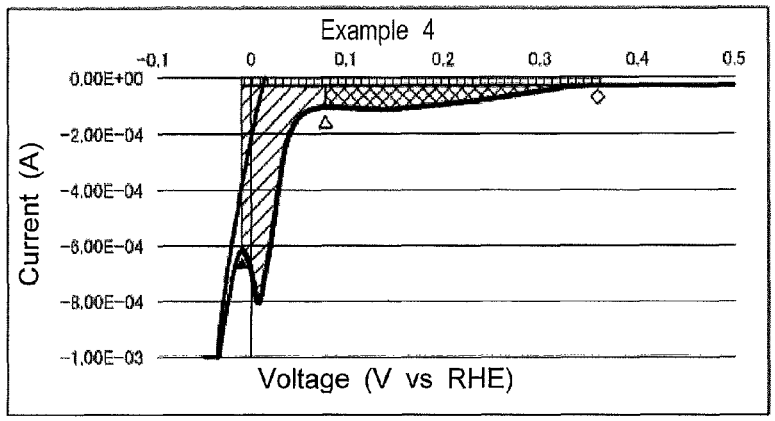
FIG. 4 is a graph showing the reduction current region of the CV of the carbon-supported catalyst of Example 4 and a hydrogen adsorption region and a hydrogen occlusion region in the reduction current region.
Figure 5:
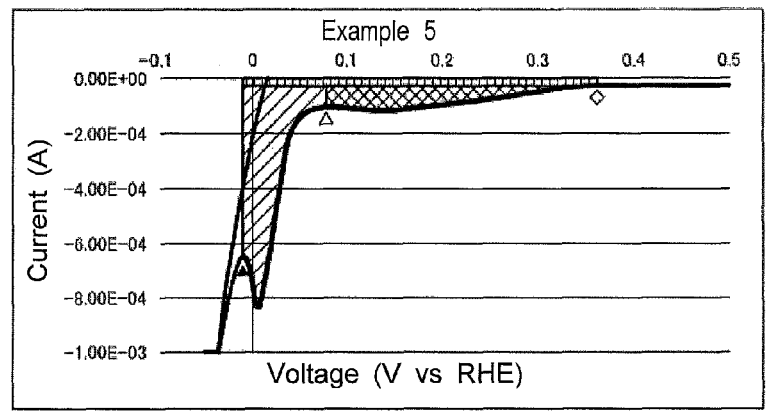
FIG. 5 is a graph showing the reduction current region of the CV of the carbon-supported catalyst of Example 5 and a hydrogen adsorption region and a hydrogen occlusion region in the reduction current region.

The carbon-supported catalyst of the present invention is a carbon-supported catalyst wherein the carbon-supported catalyst includes fine catalyst particles that have a palladium-containing particle and a platinum-containing outermost layer covering at least part of the palladium-containing particle, and a carbon support supporting the fine catalyst particles, and wherein, in a cyclic voltammogram that is obtained by measuring, in an acid solution, the carbon-supported catalyst applied to a measurement electrode made of an electroconductive material, a proportion of an area of a hydrogen adsorption region that appears in a reduction current region to a total area of the hydrogen adsorption region and a hydrogen occlusion region that appears in the reduction current region, is 29% to 36%.

As described above, according to the prior art, even if a core-shell catalyst with excellent RDE activity is synthesized, the use of the core-shell catalyst in an MEA does not always ensure excellent MEA activity. Also, as will be described below, the coverage, etc., of the core-shell catalyst cannot be accurate indicators that ensure excellent MEA activity.

The inventors of the present invention focused attention on the fact that the problem of difficulty in predicting the MEA activity from the RDE activity value, is a problem that is unique to core-shell catalysts in which a palladium-containing material is used for the core. That is, in the case where the core-shell catalyst in which the core contains palladium is used in an MEA, the cell voltage of the MEA may decrease in a low current density region where catalytic activity is particularly dominant (e.g., less than 0.2 A/cm$^2$).

For the core-shell catalyst, such a cell voltage decrease in the low current density region of the MEA, is unpredictable from the RDE activity.

As just described, the reason why the MEA activity is not predictable from the RDE activity is considered to be derived from differences in measurement environment. That is, in RDE measurement, even in the case where the palladium is eluted from the core-shell catalyst, the eluted palladium can be separated from the electrodes by rotating the electrodes and the resulting electrolyte convection. Therefore, the existence of the palladium has insignificant effects on the RDE activity. However, in MEA measurement, an MEA in which the core-shell catalyst is surrounded by electrolytes, etc., is used. Therefore, in the case where the palladium is eluted from the core-shell catalyst, the eluted palladium remains around the core-shell catalyst and creates adverse effects. For example, palladium ions remaining around the catalyst are re-deposited on the platinum surface and may reduce activity.

Due to such differences in measurement environment, although high catalytic activity is observed by the RDE measurement, a cell voltage decrease in the low current density region (that is, the MEA activity) is observed sometimes by the MEA measurement. As a proof of the adverse effects created by the palladium, it has been found from the research made by the inventors of the present invention, that in the case of an MEA that contains a carbon-supported, platinum-cobalt alloy catalyst and a carbon-supported palladium at a mass ratio of 1:1, the activity of the platinum-cobalt alloy decreases to ½ to ⅓, compared to an MEA that contains only a carbon-supported, platinum-cobalt alloy catalyst.

To find a relatively simple method for analyzing the degree of exposure of the palladium on the catalyst surface and an indicator that indicates the degree of the exposure, the inventors of the present invention made more research based on the above-mentioned finding that in the case where the palladium in the core-shell catalyst is in the state of being insufficiently covered with the platinum, the palladium exposed on the catalyst surface is eluted and results in a decrease in the MEA activity. As a result, the inventors of the present invention have found that sufficiently high RDE activity, sufficiently large ECSA and better MEA activity than ever before are obtained in the case where, for the cyclic voltammogram for the carbon-supported catalyst in an acid solution, a region derived from hydrogen occlusion by the palladium (hydrogen occlusion region) appears in a potential that is lower than a hydrogen adsorption region (H-UPD region) and the proportion of the area of the hydrogen adsorption region to the total area of these regions is in a predetermined range. Based on these findings, they achieved the present invention.

As the palladium-containing particles, at least one selected from palladium particles and palladium alloy particles can be used. The palladium alloy particles are made from palladium and at least one kind of metal selected from the group consisting of cobalt, iron, nickel, copper, iridium, ruthenium, rhodium and gold.

The average particle diameter of the palladium-containing particles is not particularly limited and is preferably 7 nm or less. If the average particle diameter of the palladium-containing particles is more than 7 nm, the surface area per mass of the platinum decreases; therefore, a large amount of platinum is required to obtain desired activities and is very expensive. If the average particle diameter of the palladium-containing particles is too small, the palladium itself is likely to dissolve and decreases the durability of the catalyst.

Therefore, the average particle diameter of the palladium-containing particles is preferably 3 nm or more, more preferably 4 nm or more.

In the present invention, the average particle diameter of the palladium-containing particles, the fine catalyst particles and the carbon-supported catalyst is calculated by a conventional method. An example of the method for calculating the average particle diameter of the palladium-containing particles, the fine catalyst particles and the carbon-supported catalyst is as follows. First, for a particle shown in a TEM image at a magnification of 400,000 to 1,000,000×, the particle diameter is calculated, on the assumption that the particle is spherical. Such a particle diameter calculation by TEM observation is carried out on 200 to 300 particles of the same type, and the average of the particles is regarded as the average particle diameter.

In the present invention, the platinum-containing outermost layer on the fine catalyst particle surface preferably has high catalytic activity. As used herein, "catalytic activity" refers to the activity which is required of a fuel cell catalyst, especially oxygen reduction reaction (ORR) activity.

The platinum-containing outermost layer can contain platinum only, or it can also contain iridium, ruthenium, rhodium or gold, in addition to platinum. In the case of using a platinum alloy for the platinum-containing outermost layer, the platinum alloy can contain platinum and only one kind of metal, or it can contain platinum and two or more kinds of metals.

From the point of view that the elution of the palladium-containing particles can be more inhibited, the coverage of the palladium-containing particle with the platinum-containing outermost layer is generally 0.5 to 2, preferably 0.8 to 1.3. In the case where the coverage of the palladium-containing particle with the platinum-containing outermost layer is less than 0.5, the palladium-containing particle is eluted in an electrochemical reaction and, as a result, the fine catalyst particles may deteriorate.

As used herein, the "coverage of the palladium-containing particle with the platinum-containing outermost layer" means the ratio of the area of the palladium-containing particle covered with the platinum-containing outermost layer, on the assumption that the total surface area of the palladium-containing particle is 1. An example of the method for calculating the coverage will be described below. First, an outermost layer metal content (A) in the fine catalyst particle is measured by inductively coupled plasma mass spectrometry (ICP-MS), etc. Meanwhile, the average particle diameter of the fine catalyst particles is measured with a transmission electron microscope (TEM), etc. From the average particle diameter thus measured, the number of atoms on the surface of a particle having the same diameter is estimated, and an outermost layer metal content (B) in the case where one atomic layer on the particle surface is substituted with the metal contained in the platinum-containing outermost layer, is estimated. The value obtained by dividing the outermost layer metal content (A) by the outermost layer metal content (B) is the "coverage of the palladium-containing particle with the platinum-containing outermost layer".

The platinum-containing outermost layer covering the palladium-containing particle is preferably a monoatomic layer. The fine catalyst particle having such a structure is advantageous in that, compared to a fine catalyst particle having a platinum-containing outermost layer that is composed of two or more atomic layers, the catalytic performance of the platinum-containing outermost layer is much higher and, since the amount of the platinum-containing outermost layer covering the palladium-containing particle is small, the material cost is lower.

The lower limit of the average particle diameter of the fine catalyst particles is preferably 2.5 nm or more, more preferably 3 nm or more. The upper limit is preferably 40 nm or less, more preferably 10 nm or less.

In addition, the fine catalyst particles are supported on a support and constitute the carbon-supported catalyst of the present invention. The support is not particularly limited. An electroconductive support is preferably used as the support, from the point of view that in the case of using the carbon-supported catalyst of the present invention for the electrocatalyst layer of a fuel cell, electroconductivity is provided to the electrocatalyst layer.

Concrete examples of materials that can be used as the support for supporting the fine catalyst particles include: electroconductive carbonaceous materials including carbon particles and carbon fibers, such as: Ketjen Black (product name; manufactured by: Ketjen Black International Company), Vulcan (product name; manufactured by: Cabot), Norit (product name; manufactured by: Norit), Black Pearls (product name; manufactured by: Cabot), Acetylene Black (product name; manufactured by: Chevron), OSAB (Denka Co., Ltd.), carbon nanotubes and carbon nanofibers; metal materials including metal particles and metal fibers; and non-electroconductive materials including organic pigments, such as perylene red.

In the present invention, the cyclic voltammogram is obtained by measuring, in an acid solution, the carbon-supported catalyst applied to a measurement electrode made of an electroconductive material. In the present invention, preferably, the acid solution is a 0.1 M perchloric acid aqueous solution, is subjected to inert gas bubbling, and has a temperature of 25° C.

In the present invention, preferably, the cyclic voltammogram is obtained by cyclic voltammetry under conditions that the sweep rate is 50 mV/s and the acid solution is the above-mentioned acid solution.

A cyclic voltammogram is a current-potential curve that appears by a potential sweep, with current on the vertical axis and potential on the horizontal axis. In general, positive current is defined as oxidation current, and negative current is defined as reduction current. Therefore, the reduction current region of the cyclic voltammogram refers to a negative current region.

Hereinafter, a concrete example of the cyclic voltammetry will be described.

First, a powder of the carbon-supported catalyst is added to and dispersed in a solvent that contains at least water. A dispersion thus obtained is applied to the working electrode of an electrochemical cell and naturally dried.

The dispersion can be attached onto the working electrode, etc., using an electrolyte as a binder, such as a perfluorocarbon sulfonic acid polymer-based electrolyte (e.g., Nafion (trade name) manufactured by DuPont). A solvent such as water or alcohol can be added to the dispersion, appropriately.

As the working electrode, a measurement electrode made of an electroconductive material can be used, such as a glassy carbon electrode.

As the reference electrode, a reversible hydrogen electrode (hereinafter may be referred to as RHE) which is used by injecting hydrogen into platinum, or a silver-silver chloride electrode is used. In the case of converting a measurement value for the silver-silver chloride electrode into a value for the reversible hydrogen electrode, the potential difference between the RHE and the silver-silver chloride electrode is measured in advance and corrected later.

As the reference electrode, a platinum electrode or the like can be used.

Figure 9:
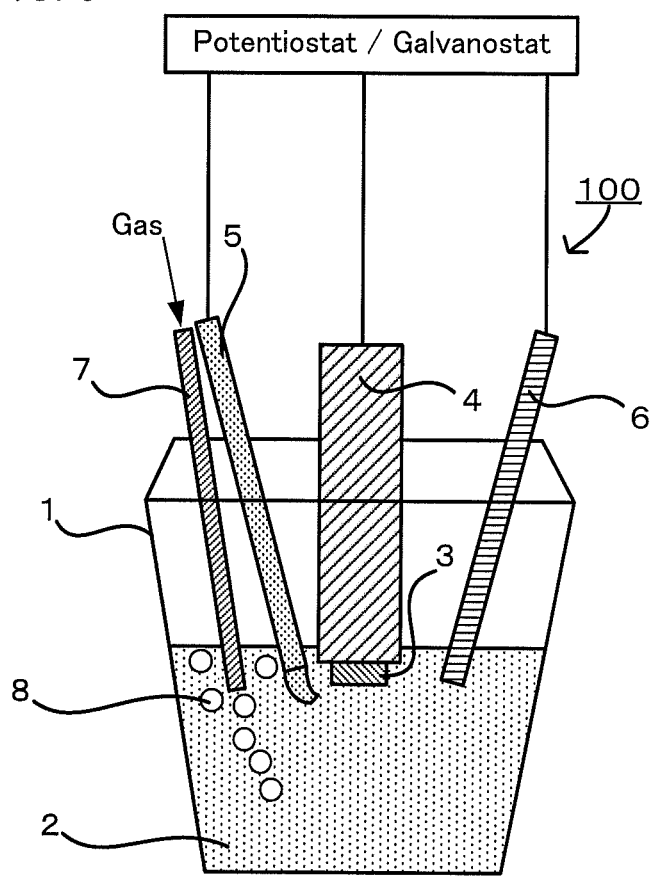
FIG. 9 is a schematic perspective view of an electrochemical device for cyclic voltammetry.

FIG. 9 is a schematic perspective view of an electrochemical device for cyclic voltammetry. An electrochemical device 100 includes a glass cell 1, an electrolyte 2 placed in the cell, a working electrode 4, and a dispersion 3 applied to the electrode. In the glass cell 1, the working electrode 4, a reference electrode 5 and a counter electrode 6 are placed so that they are sufficiently immersed in the electrolyte 2, and the three electrodes are electrically connected to a potentiostat/galvanostat. Also, a gas inlet tube 7 is placed so that it is immersed in the electrolyte 2. At room temperature, an inert gas is bubbled into the electrolyte 2 from an inert gas supply source (not shown) placed outside the cell for a certain period of time to saturate the electrolyte 2 with the inert gas. Bubbles 8 indicate the bubbles of the inert gas. As the inert gas, nitrogen, argon or a mixed gas thereof can be used. Then, the cyclic voltammetry is carried out.

In the case of carrying out the cyclic voltammetry of the carbon-supported catalyst using an RDE as the working electrode, from the viewpoint of potential stability, the cyclic voltammetry is preferably carried out after immersing the RDE in an electrolyte, rotating the RDE in the electrolyte, and stopping the rotation few minutes after the immersion.

The conditions of the cyclic voltammetry are preferably conditions that do not cause a deterioration in the fine catalyst particles or a deterioration in the support (carbon). A concrete example of the conditions of the cyclic voltammetry using the RDE is as follows.

Electrolyte: 0.1 M $HClO_4$ aq (subjected to inert gas bubbling)
Atmosphere: Under inert gas atmosphere
Sweep rate: 50 mV/sec
Potential sweep rate: −0.05 V to 1 V (vs. RHE)
Reference electrode: Reversible hydrogen electrode (RHE)

In the present invention, the hydrogen adsorption region (H-UPD region) is a region that corresponds to a current that flows when protons ($H^+$) equivalent to one layer adsorb to the fine catalyst particle surface. Since the protons adsorb to both the platinum and the palladium on the fine catalyst particle surface, the area of the hydrogen adsorption region corresponds to the amount of the platinum and the palladium present on the fine catalyst particle surface.

In the present invention, the hydrogen occlusion region is a region that corresponds to a current that flows when the palladium exposed onto the fine catalyst particle surface occludes hydrogen. As used herein, the palladium exposed onto the fine catalyst particle surface encompasses both the surface of the palladium-containing particle not covered with the platinum-containing outermost layer, and the palladium that is seen between platinum atoms on the fine catalyst particle surface. The area of the hydrogen occlusion region basically corresponds to the amount of the palladium exposed on the fine catalyst particle surface.

In the present invention, for sake of simplicity, it is considered that the hydrogen adsorption region and the hydrogen occlusion region are not overlapped with each other. More specifically, in the present invention, hydrogen adsorption on the fine catalyst particle surface starts from initial potential $E_0$ and ends at potential $E_1$. Meanwhile, hydrogen occlusion starts from potential $E_1$ and ends at end potential $E_2$. In this case, the area of the hydrogen adsorption region can be defined as a value that is obtained by integrating a current value from the initial potential $E_0$ to the potential $E_1$ with respect to potential and then subtracting an electric double layer capacitance from the resulting integral value. Also, the area of the hydrogen occlusion region can be defined as a value that is obtained by integrating a current value from the potential $E_1$ to the end potential $E_2$ with respect to potential and then subtracting an electric double layer capacitance from the resulting integral value.

The initial potential $E_0$ is a potential at which a region that indicates an electric double layer (to about 0.4 V (vs. RHE)) ends. The initial potential $E_0$ can be determined as follows, for example.

In cyclic voltammetry, potential is cycled in such manner that after a potential sweep from a low potential side to a high potential side is carried out, the sweep is changed to a low potential side at a given potential and then changed to a high potential side at a given potential. A curve that appears in the case where a potential is swept from a high potential side to a low potential side is referred to as reduction wave. For the reduction wave of the cyclic voltammogram in the present invention, a part where the slope of a tangent line to the reduction wave is considered to be $1.0 \times 10^{-5}$ to 0 (A/V), that is, to be almost 0 (A/V), exists in a potential range of 0.3 to 0.4 V (vs. RHE). It is considered that in this part, any electrochemical reaction does not occur on the catalyst metal surface, and charge and discharge occur in the carbon support. A potential at which, just after this initial sweep part, the slope of the tangent line to the reduction wave becomes a predetermined slope, can be determined as the initial potential $E_0$. As used herein, the predetermined slope is a slope in a range of $5.0 \times 10^{-4}$ to $1.0 \times 10^{-4}$ (A/V), for example.

The initial potential $E_0$ can be 0.35 V (vs. RHE), for example.

The potential $E_1$ is a potential at which hydrogen adsorption ends and hydrogen occlusion starts. The potential $E_1$ can be determined as follows, for example. For the reduction wave of the cyclic voltammogram in the present invention, a potential range where the slope of a tangent line to the reduction wave is $-1.0 \times 10^{-5}$ to $1.0 \times 10^{-5}$ (A/V) exists in a potential range of 0.05 to 0.1 V (vs. RHE). The potential in the range of the slope of the tangent line can be determined as the potential $E_1$. Here, the slope is a slope in a range of 0 to $1.0 \times 10^{-4}$ (A/V), for example. In the case where maximum current value exists in a potential range of 0.05 to 0.1 V (vs. RHE), the potential corresponding to the maximum current value is preferably regarded as the potential $E_1$.

For example, the potential $E_1$ can be 0.075 V (vs. RHE).

The end potential $E_2$ is a potential at which hydrogen occlusion ends and the release of hydrogen ($H_2$) is initiated by reduction of protons. The end potential $E_2$ can be determined as follows, for example. For the reduction wave of the cyclic voltammogram, a potential range where the slope of a tangent line to the reduction wave becomes $-1.0 \times 10^{-5}$ to $1.0 \times 10^{-5}$ (A/V) exists in a potential range of −0.05 to 0.05 V (vs. RHE). The potential in the range of the slope of the tangent line can be determined as the end potential $E_2$. Here, a predetermined the slope is a slope in a range of 0 to $1.0 \times 10^{-4}$ (A/V), for example. In the case where the maximum current value exists in a potential range of −0.05 to 0.05 V (vs. RHE), the potential corresponding to the maximum current value is preferably regarded as the end potential $E_2$.

For example, the end potential $E_2$ can be 0 V (vs. RHE).

FIG. 1 is a graph showing the reduction current region of the CV of the carbon-supported catalyst of Example 1 and a hydrogen adsorption region and a hydrogen occlusion region in the reduction current region. Using FIG. 1, concrete examples of the hydrogen adsorption region and the hydrogen occlusion region will be described.

For the CV in FIG. 1, a rhombus (◇) indicates a part corresponding to the initial potential $E_0$; a white triangle (△) indicates a part corresponding to the potential $E_1$; and a black triangle (▲) indicates a part corresponding to the end potential $E_2$.

In FIG. 1, the area of the hydrogen adsorption region is indicated as a part (a cross-hatched region) that is obtained by integrating a current value from the start point (◇) to the end point (△) with respect to potential and then subtracting an electric double layer capacitance of the potential range from the resulting integral value (electrical quantity). On the other hand, in FIG. 1, the area of the hydrogen occlusion region is indicated as a part (a hatched region) that is obtained by integrating a current value from the start point (△) to the end point (▲) with respect to potential and then subtracting an electric double layer capacitance from the resulting integral value (electrical quantity). In FIG. 1, the electric double layer capacitance is shown by vertical stripes.

In the cyclic voltammogram, the proportion of the area of the hydrogen adsorption region that appears in the reduction current region to the total area of the hydrogen adsorption region and the hydrogen occlusion region that appears in the reduction current region (hereinafter may be referred to as the area proportion of the hydrogen adsorption region) is generally 29% to 36%, preferably 31% to 35%. The area proportion (%) of the hydrogen adsorption region is obtained by dividing the area of the hydrogen adsorption region by the total area of the hydrogen occlusion region and the hydrogen adsorption region and multiplying the resulting value by 100.

A method for differentiating the platinum surface and the palladium surface in the core-shell catalyst has not been established. As a result of studying differences in characteristics between platinum and palladium, the inventors of the present invention focused attention on the point that while both palladium and platinum adsorb hydrogen, only palladium occludes hydrogen. Therefore, they conceived the calculation of the area proportion.

Due to the above characteristics of platinum and palladium, the area of the hydrogen adsorption region corresponds to the total surface area of the fine catalyst particles containing the platinum and the palladium; meanwhile, the area of the hydrogen occlusion region is involved in not only the palladium present on the surface of the fine catalyst particles, but also the palladium inside the fine catalyst particles. Therefore, it cannot be said that catalytic activity becomes better as the area proportion of the hydrogen adsorption region increases.

In the reduction current region, there is a difference in behavior between the case where the platinum-containing outermost layer is a monoatomic layer and the case where the platinum-containing outermost layer is composed of two or more stacked atomic layers. In the case where the platinum-containing outermost layer is a layer that is as thin as a platinum monoatomic layer, even if platinum atoms are regularly arranged, hydrogen can enter between the platinum atoms, due to its small atomic radius. Therefore, in the case where the platinum-containing outermost layer is the platinum monoatomic layer, even if the coverage of the palladium-containing particle with the layer is 100%, hydrogen occlusion may be caused by the palladium. However, if the platinum monoatomic layer is not regularly dense, hydrogen is occluded even inside the palladium-containing particle.

In light of the above, the case where the area proportion of the hydrogen adsorption region is less than 29% means mainly a case where the platinum amount in the outermost layer is small and the state of being covered with the outermost layer is poor. As just described, for the fine catalyst particle with such a thin, poor shell, the amount of the palladium exposed on the surface is high, so that the activity of the platinum in the MEA is decreased.

On the other hand, the case where the area proportion of the hydrogen adsorption region is 29% or more means that small atoms like hydrogen are less likely to be occluded inside the fine catalyst particle. In this case, even hydrogen cannot freely penetrate the inside of the fine catalyst particle; therefore, it can be said that there is no elution of the palladium in the palladium-containing particle to the outside.

Meanwhile, the case where the area proportion of the hydrogen adsorption region is more than 36% means mainly a case where the platinum-containing outermost layer is composed of multi-atomic layers. In the case of the fine catalyst particle with such an excessively thick shell, the platinum-containing outermost layer does not allow the penetration of hydrogen. Therefore, although the hydrogen occlusion region decreases, the surface area per mass of the platinum also decreases and, as a result, both the RDE activity and the MEA activity become poor. That is, although the MEA activity expected from the RDE activity can be obtained, the surface area per mass of the platinum largely decreases and the advantage of the core-shell catalyst is lost.

Due to the above, the condition for the above numerical range of the area proportion of the hydrogen adsorption region is satisfied only in the case where, for the thickness of the platinum-containing outermost layer, the overlapping state of the layers constituting the platinum-containing outermost layer, and the state of arrangement of the platinum atoms in the outermost layer, the right conditions that do not allow the palladium to exist on the fine catalyst particle surface, are offered.

As will be shown by the below-described examples (especially FIGS. 7 and 16), the area proportion of the hydrogen adsorption region in the present invention and the coverage that has been used for evaluation of core-shell catalysts, are absolutely different property values.

The coverage means the percentage of the platinum-containing outermost layer present on the fine catalyst particle surface. Therefore, even if the coverage is used as an indicator for evaluation of the fine catalyst particles, it is difficult to evaluate the overlapping state or the atomic arrangement state of the platinum-containing outermost layer.

Therefore, from the coverage that does not include the information on the overlapping state or the atomic arrangement state of the platinum-containing outermost layer, even if the RDE activity can be predicted, it is difficult to predict the MEA activity which is subjected to stronger influence of defects in the platinum-containing outermost layer.

Figure 10:
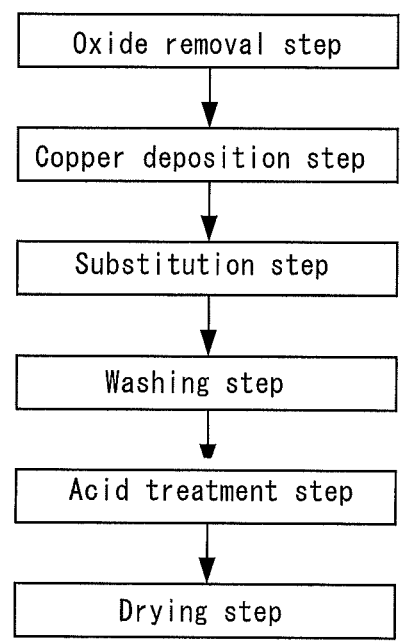
FIG. 10 is a flow chart of an example of a method for producing the carbon-supported catalyst of the present invention.

FIG. 10 is a flow chart of an example of a method for producing the carbon-supported catalyst of the present invention.

The carbon-supported catalyst production method shown in FIG. 10 has (1) an oxide removal step, (2) a copper deposition step, (3) a substitution step, (4) a washing step, (5) an acid treatment step and (6) a drying step.

The carbon-supported catalyst production method of the present invention has (2) the copper deposition step and (3) the substitution step. As needed, the production method includes (1) the oxide removal step before the copper deposition step, and it includes (4) the washing step, (5) the acid treatment step, (6) the drying step, etc., after the substitution step.

Hereinafter, these steps will be described in order.

(1) Oxide Removal Step

The oxide removal step is a step of removing palladium oxides (impurities) from the surface of the palladium-containing particles, before the copper deposition step. By the oxide removal step, the palladium-containing particles can be uniformly covered with the platinum-containing outermost layer.

For example, the oxide removal can be carried out by applying a predetermined potential to the palladium-containing particles in an electrolyte containing the palladium-containing particles.

To apply the potential to the palladium-containing particles, there may be used the same method and potential control device as those of the below-described copper deposition step.

The electrolyte which can be used in the oxide removal step is not particularly limited, as long as it is a solution in which palladium oxides can be eluted by an appropriate potential sweep.

Concrete examples of the electrolyte include an acid solution. Concrete examples of the acid which can be used in the oxide removal step include the same acids as those which can be used for a copper ion-containing electrolyte to be described below.

In the case where the oxide removal step and the below-described copper deposition step are carried out in the same reaction container, the copper ion-containing electrolyte can be added to the electrolyte used in the oxide removal step. For example, in the case where sulfuric acid is used as the electrolyte of the oxide removal step, a copper sulfate aqueous solution can be added to the used sulfuric acid and used in the copper deposition step. Counter anions in the electrolyte used in the oxide removal step and counter anions in the copper ion-containing electrolyte used in the copper deposition step can be the same kind or different kinds of counter anions.

It is preferable to bubble nitrogen into the electrolyte, from the viewpoint of removing oxygen in the electrolyte as much as possible and allowing quick oxide removal.

From the viewpoint of quick oxide removal, it is preferable to sweep the potential back and forth several times in a predetermined potential range. Examples of the signal pattern of the applied potential include a square wave, a triangle wave and a trapezoidal wave.

The potential range is not particularly limited and is preferably 0.05 to 1.2 V (vs. RHE).

In the case where the signal pattern of the applied potential is a square wave, the number of potential cycles is not particularly limited. Holding 0.05 V (vs. RHE) for 15 to 60 seconds and then holding 1.2 V (vs. RHE) for 15 to 60 seconds are considered as one cycle, and it is preferable to carry out 1,000 to 2,500 cycles.

In the case where the signal pattern of the applied potential is a triangle wave, the number of the potential cycles is not particularly limited and is preferably 800 to 3,000 cycles. The potential sweep rate can be 5 to 100 mV/sec, for example.

In the oxide removal step, the temperature inside the reaction system is not particularly limited. In the case where the oxide removal step, the copper deposition step and the substitution step are carried out in the same reaction container, from the viewpoint of quickly adjusting the temperature inside the reaction system in the substitution step to −3° C. or more and 10° C. or less, it is preferable to keep the temperature at −3° C. or more and 10° C. or less.

The palladium-containing particles used in this step are preferably supported on the above-described support.

(2) Copper Deposition Step

The copper deposition step is a step of depositing copper on the surface of the palladium-containing particles by applying a potential that is nobler than the oxidation-reduction potential of copper to the palladium-containing particles in a copper ion-containing electrolyte.

The copper ion-containing electrolyte is not particularly limited, as long as it is an electrolyte in which copper can be deposited on the surface of the palladium-containing particles by Cu-UPD. The copper ion-containing electrolyte is generally composed of a solvent in which a predetermined amount of copper salt is dissolved. However, the electrolyte is not limited to this constitution and is required to be an electrolyte in which a part or all of the copper ions are separately present.

As the solvent used for the copper ion-containing electrolyte, there may be mentioned water and organic solvents. Water is preferred from the point of view that it does not prevent the deposition of copper on the surface of the palladium-containing particles.

Concrete examples of the copper salt used for the copper ion-containing electrolyte include copper sulfate, copper nitrate, copper chloride, copper chlorite, copper perchlorate and copper oxalate.

The copper ion concentration of the electrolyte is not particularly limited and is preferably 10 to 1,000 mM.

In addition to the solvent and the copper salt, the copper ion-containing electrolyte can contain an acid, for example. Concrete examples of acids that can be added to the copper ion-containing electrolyte include sulfuric acid, nitric acid, hydrochloric acid, chlorous acid, perchloric acid and oxalic acid. Counter anions in the copper ion-containing electrolyte and counter anions in the acid can be the same kind or different kinds of counter anions.

It is also preferable to bubble an inert gas into the electrolyte in advance. This is because the palladium-containing particles can be inhibited from oxidation and can be uniformly covered with the platinum-containing shell. As the inert gas, there may be used nitrogen gas, argon gas, etc.

The palladium-containing particles can be immersed and dispersed in the electrolyte by adding the particles in a powdery state to the electrolyte, or the palladium-containing particles can be immersed and dispersed in the electrolyte by dispersing the particles in a solvent to prepare a palladium-containing particle dispersion and then adding the dispersion to the electrolyte. As the solvent used for the palladium-containing particle dispersion, there may be used the same solvent as that used for the above-described copper ion-containing electrolyte. Also, the palladium-containing particle dispersion can contain the above-described acid that can be added to the copper ion-containing electrolyte.

Also, the palladium-containing particles can be immersed in the electrolyte by fixing the particles on an electroconductive substrate or working electrode and then immersing a surface having the palladium-containing particles fixed thereon of the electroconductive substrate or working electrode in the electrolyte. To fix the palladium-containing particles, for example, there may be mentioned the following method: a paste containing the palladium-containing particles is prepared using an electrolyte resin (such as Nafion (trade name)) and a solvent (such as water or alcohol) and applied to a surface of the electroconductive substrate or working electrode, thereby fixing the palladium-containing particles.

The method for applying a potential to, the palladium-containing particles is not particularly limited, and it can be a general method. For example, there may be mentioned a method of immersing a working electrode, a counter electrode and a reference electrode in the copper ion-containing electrolyte and then applying a potential to the working electrode.

As the working electrode, for example, there may be used materials that can ensure electroconductivity, such as metal materials including titanium, a platinum mesh, a platinum plate and a gold plate, and electroconductive carbonaceous materials including glassy carbon and a carbon plate. Also, the reaction container can be formed with any of the electroconductive materials and used as the working electrode. In the case where the reaction container made of a metal material is used as the working electrode, it is preferable that the inner wall of the reaction container is coated with $RuO_2$, from the viewpoint of preventing corrosion. In the case where the reaction container made of a carbonaceous material is used as the working electrode, the container can be used as it is without any coating.

As the counter electrode, for example, there may be used a platinum black-plated platinum mesh and electroconductive carbon fibers.

As the reference electrode, for example, there may be used a reversible hydrogen electrode (RHE), a silver-silver chloride electrode and a silver-silver chloride-potassium chloride electrode.

As the potential control device, for example, there may be used a potentiostat and a potentio-galvanostat.

The applied potential is not particularly limited, as long as it is a potential that can deposit copper on the surface of the palladium-containing particles, that is, a nobler potential than the oxidation-reduction potential of copper. For example, the applied potential is preferably in a range of 0.35 to 0.7 V (vs. RHE), particularly preferably 0.4 V (vs. RHE).

The potential applying time is not particularly limited. It is preferable to apply the potential for 60 minutes or more, and it is more preferable to apply the potential until reaction current becomes steady and close to zero.

The potential can be applied by a potential sweep in a range that includes the above potential range. More specifically, the potential sweep range is preferably 0.3 to 0.8 V (vs. RHE). The number of the potential sweep cycles is not particularly limited and is preferably 1 to 10,000 cycles. The potential sweep rate is 0.01 to 100 mV/sec, for example.

From the viewpoint of preventing the oxidation of the surface of the palladium-containing particles and preventing the oxidation of the copper, it is preferable to carry out the copper deposition step under an inert gas atmosphere such as nitrogen atmosphere.

Also in the copper deposition step, it is preferable to appropriately stir the copper ion-containing electrolyte, as needed. For example, in the case where the reaction container that functions as the working electrode is used and the palladium-containing particles are immersed and dispersed in the electrolyte in the reaction container, the palladium-containing particles can be brought into contact with the surface of the reaction container (working electrode) by stirring the electrolyte, and thus a uniform potential can be applied to the palladium-containing particles. In this case, the stirring can be carried out continuously or intermittently in the copper deposition step.

In the copper deposition step, the temperature inside the reaction system is not particularly limited. In the case where the copper deposition step and the below-described substitution step are carried out in the same reaction container, from the viewpoint of quickly adjusting the temperature inside the reaction system in the substitution step to $-3°$ C. or more and $10°$ C. or less, it is preferable to keep the temperature at $-3°$ C. or more and $10°$ C. or less.

(3) Substitution Step

The substitution step is a step of forming the shell by, after the copper deposition step and inside the reaction system kept at $-3°$ C. or more and $10°$ C. or less, substituting the copper deposited on the surface of the palladium-containing particles with platinum by bringing the copper into contact with a platinum ion-containing solution in which platinum ions and a reaction inhibitor that inhibits a substitution reaction between the copper and the platinum, are contained.

In the present invention, "inside the reaction system" is a concept that encompasses regions used for reactions (such as reaction container and device) and gasses, liquids and solids stored in the regions.

In the substitution step, the temperature inside the reaction system is required to be kept at $-3°$ C. or more and $10°$ C. or less. From the viewpoint of forming a uniform shell on the surface of the palladium-containing particles, the temperature is preferably kept at $3°$ C. or more and $9°$ C. or less, particularly preferably $5°$ C. or more and $8°$ C. or less. In the case where the temperature is less than $-3°$ C., the solution is frozen and no reaction may proceed. In the case where the temperature is more than $10°$ C., sufficient platinum mass activity may not be obtained.

The method for keeping the temperature inside the reaction system is not particularly limited. For example, there may be mentioned a method that uses a circulation cooling device (chiller) or a cooling tube.

The platinum ion-containing solution is not particularly limited, as long as it contains at least platinum ions and a reaction inhibitor.

The reaction inhibitor is not particularly limited, as long as it can inhibit a substitution reaction between the copper and the platinum. Examples of the reaction inhibitor include a complex forming agent that forms a complex with the platinum, the copper deposited on the palladium-containing particle surface, and the palladium exposed on the palladium-containing particle surface, in the solution.

Examples of the complex forming agent include citric acid, sodium salt of citric acid, potassium salt of citric acid, ethylenediaminetetraacetic acid (hereinafter may be referred to as EDTA), sodium salt of EDTA, and potassium salt of EDTA. Preferred is citric acid. These complex forming agents can be used alone or in combination of two or more. In the solution, these complex forming agents form a complex with the platinum and copper; therefore, the substitution reaction between the copper and the platinum is inhibited and, as a result, the surface of the palladium-containing particles can be uniformly covered with the platinum-containing shell.

The concentration of the reaction inhibitor in the platinum ion-containing solution is not particularly limited and is preferably 1 to 10 times higher than the platinum ion concentration.

A platinum salt is used for the platinum ion-containing solution. Examples of the platinum salt include $K_2PtCl_4$ and $K_2PtCl_6$. Also, an ammonia complex such as ($[PtCl_4][Pt(NH_3)_4]$) can be used.

The platinum ion concentration of the platinum ion-containing solution is not particularly limited and is preferably 0.01 to 100 mM.

A solvent is used for the platinum ion-containing solution. The solvent can be the same as the solvent used for the copper ion-containing electrolyte described above.

In addition to the solvent, the reaction inhibitor and the platinum salt, the platinum ion-containing solution can also contain an acid, etc. The acid can be the same as the acid used for the copper ion-containing electrolyte described above.

From the viewpoint of keeping the temperature inside the reaction system at −3° C. or more and 10° C. or less, it is preferable to adjust the temperature of the platinum ion-containing solution to −3° C. or more and 10° C. or less in advance. Also, the platinum ion-containing solution is sufficiently stirred, and from the viewpoint of preventing the oxidation of the surface of the palladium-containing particles or preventing the oxidation of the copper, it is preferable to bubble nitrogen into the solution in advance.

The substitution time (contact time between the platinum ion-containing solution and the palladium-containing particles) is not particularly limited and is preferably 10 minutes or more. Since the potential of the reaction solution is increased by adding the platinum ion-containing solution, it is more preferable to continue the substitution until the potential monitored shows no change.

The method for bringing the copper deposited on the surface of the palladium-containing particles into contact with the platinum ion-containing solution is not particularly limited. In the case where the copper deposition step and the substitution step are carried out in the same reaction container, the platinum ion-containing solution can be added to the electrolyte used in the copper deposition step. For example, it is allowed that after the copper deposition step, the potential control is stopped, and the platinum ion-containing solution is added to the copper ion-containing electrolyte used in the copper deposition step, thereby bringing the palladium-containing particles on which copper is deposited into contact with the platinum ion-containing solution.

(4) Washing Step

The washing step is a step of washing, with water, the palladium-containing particles subjected to the substitution of the copper with the platinum, after the substitution step. From the viewpoint of eluting the reaction inhibitor physically adsorbing to the support surface, the washing step is preferably carried out before the acid treatment step.

In the washing step, as the water, cold or hot water can be used. Or, cold water and hot water can be mixed together and used for washing. More specifically, the palladium-containing particles can be washed with cold water at less than 30° C. and then washed with hot water.

The temperature of the hot water is preferably 30° C. or more and 100° C. or less, from the viewpoint of eluting the reaction inhibitor physically adsorbing to the support surface.

The washing step is preferably a step of washing the palladium-containing particles by dispersing them in water, preferably in hot water. The method for dispersing the palladium-containing particles in water is not particularly limited. For example, there may be mentioned a dispersion method with ultrasonic waves, a method of pulverizing the particles with a ball mill and then adding them to water, and a method for dispersing the particles with a device that uses shear force, such as a nanomizer. Of them, the dispersion method with ultrasonic waves is preferably used, from the viewpoint of relatively less damage to the structure of the palladium-containing particles.

It is preferable to repeat the washing step until the conductivity of the water used for washing (hereinafter may be referred to washing water) reaches 10 μS/cm or less. This is because the amount of the reaction inhibitor physically adsorbing to the support surface is determined to be still large in the case where the conductivity of the washing water is high. In particular, the washing water refers to supernatant water obtained by adding the palladium-containing particles to water (10 g per 1 L of water) in a container and dispersing them.

(5) Acid Treatment Step

The acid treatment step is a step of bringing an acid solution into contact with the palladium-containing particles subjected to the substitution of the copper with the platinum, after the substitution step. By the acid treatment, the palladium-containing particles exposed are selectively eluted, so that the palladium-containing particles become smaller. Therefore, the defective sites of the platinum-containing outermost layer are mended, so that the platinum mass activity of the fine catalyst particles can be increased.

Examples of the acid solution include nitric acid, sulfuric acid, perchloric acid, hydrochloric acid and hypochlorous acid. From the viewpoint of having an oxidizing power that is sufficient to dissolve the palladium, nitric acid is preferred.

The concentration of the acid solution is as follows: for example, in the case of using nitric acid as the acid solution, the nitric acid concentration is preferably $1.0 \times 10^{-4}$ to 2 mol/L, more preferably $1.0 \times 10^{-3}$ to 1 mol/L, still more preferably $1.0 \times 10^{-2}$ to $1.0 \times 10^{-1}$ mol/L.

In the case of using sulfuric acid as the acid solution, the sulfuric acid concentration is preferably $1.0 \times 10^{-4}$ to 2 mol/L, more preferably $1.0 \times 10^{-3}$ to 1 mol/L, still more preferably $1.0 \times 10^{-2}$ to $1.0 \times 10^{-1}$ mol/L.

The temperature of the acid solution is preferably 40° C. or more, particularly preferably 50° C. or more, since the defective sites of the platinum-containing outermost layer can be effectively and efficiently mended. Also, the temperature of the acid solution is preferably 90° C. or less, particularly preferably 80° C. or less, from the viewpoint of preventing the palladium-containing particles from aggregation, etc.

The time to bring the palladium-containing particles into contact with the acid solution can be appropriately adjusted, depending on the type, concentration, temperature, etc., of the acid solution. For example, it can be about 30 minutes to 2 hours.

The method for bringing the palladium-containing particles into contact with the acid solution is not particularly limited. From the viewpoint of allowing the acid reaction to sufficiently proceed, a method for immersing the palladium-containing particles in the acid solution is preferred. At the time of immersing the palladium-containing particles in the acid solution, it is preferable to stir the acid solution and disperse the particles with a ultrasonic homogenizer, a magnetic stirrer, a motor with stirring blades, etc.

(6) Drying Step

The drying step is a step of drying the carbon-supported catalyst obtained after the substitution step.

The method for drying the carbon-supported catalyst is not particularly limited, as long as it is a method that can remove the solvent, etc. For example, there may be mentioned such a drying method that a temperature of 50 to 100° C. is kept for 6 to 12 hours under an inert gas atmosphere.

As needed, the carbon-supported catalyst can be pulverized. The pulverizing method is not particularly limited, as long as it is a method that can pulverize solids. Examples of the pulverization include pulverization using a mortar or the like under an inert atmosphere or in the atmosphere, and mechanical milling using a ball mill, turbo mill or the like.

The carbon-supported catalyst of the present invention is preferably for use in fuel cells. From the viewpoint of excellent oxygen reduction activity, the carbon-supported catalyst of the present invention is preferably used in electrodes for fuel cells, more preferably in cathode electrodes for fuel cells.

Figure 11:
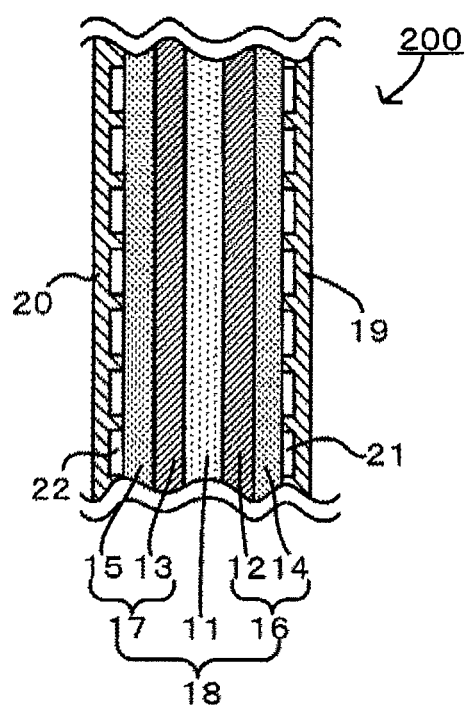
FIG. 11 is a view of an example of a fuel cell using the carbon-supported catalyst of the present invention, and it is also a schematic sectional view of the fuel cell cut along a laminating direction.
Figure 12:
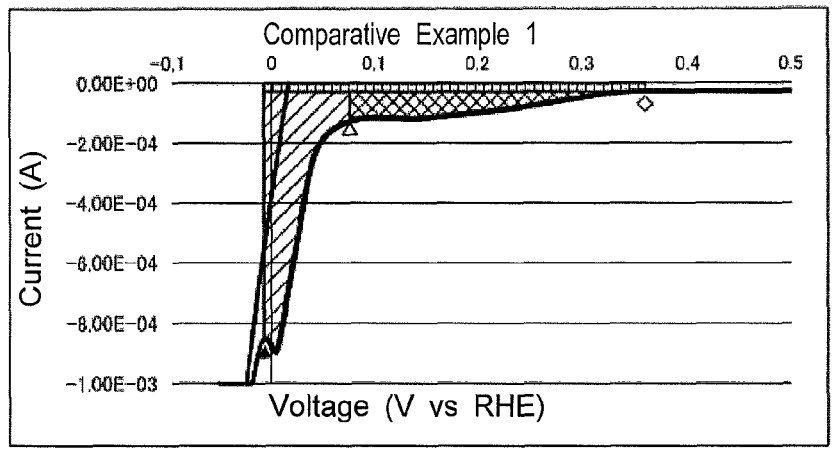
FIG. 12 is a graph showing the reduction current region of the CV of the carbon-supported catalyst of Comparative Example 1 and a hydrogen adsorption region and a hydrogen occlusion region in the reduction current region.
Figure 13:
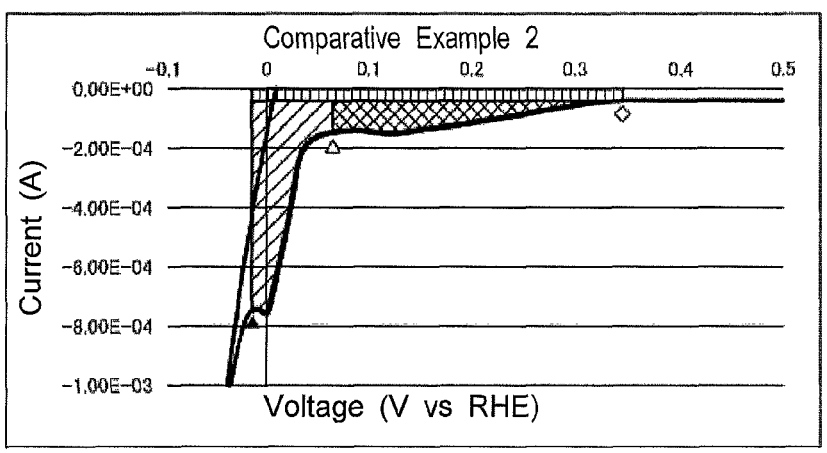
FIG. 13 is a graph showing the reduction current region of the CV of the carbon-supported catalyst of Comparative Example 2 and a hydrogen adsorption region and a hydrogen occlusion region in the reduction current region.
Figure 14:
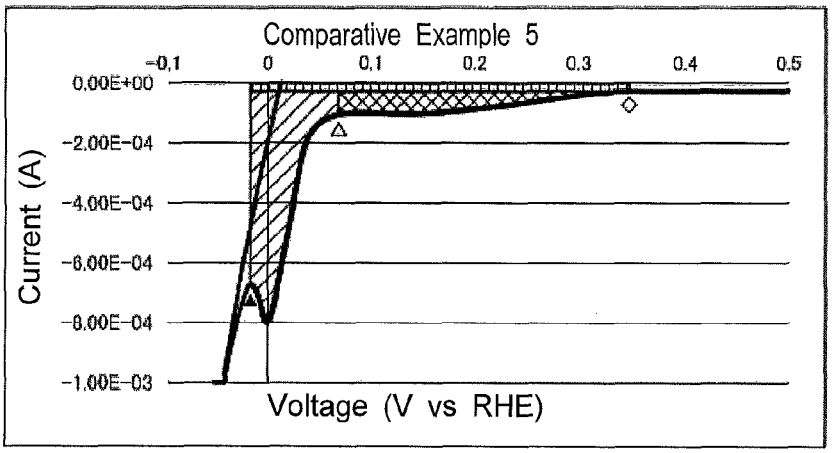
FIG. 14 is a graph showing the reduction current region of the CV of the carbon-supported catalyst of Comparative Example 5 and a hydrogen adsorption region and a hydrogen occlusion region in the reduction current region.
Figure 15:
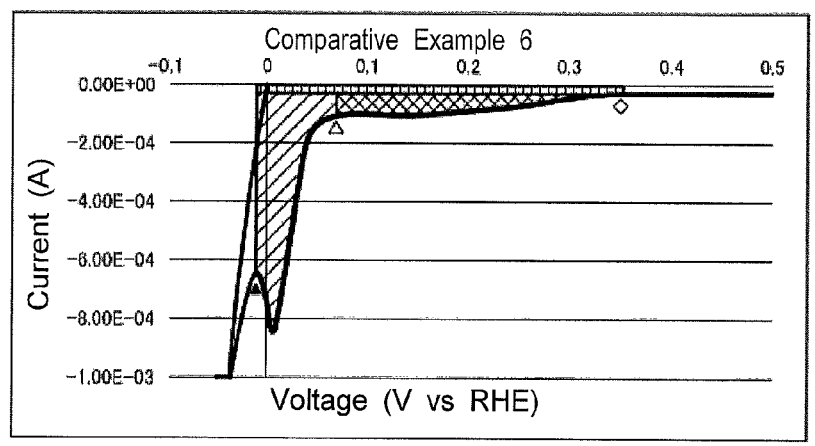
FIG. 15 is a graph showing the reduction current region of the CV of the carbon-supported catalyst of Comparative Example 6 and a hydrogen adsorption region and a hydrogen occlusion region in the reduction current region.

FIG. 11 is a view of an example of a fuel cell using the carbon-supported catalyst of the present invention, and it is also a schematic sectional view of the fuel cell cut along a laminating direction. A membrane electrode assembly 18 includes a hydrogen ion-conducting polyelectrolyte membrane (hereinafter may be simply referred to as electrolyte membrane) 11 and a pair of a cathode electrode 16 and an anode electrode 17, between which the electrolyte membrane 11 is sandwiched. A fuel cell 200 includes the membrane electrode assembly 18 and a pair of separators 19 and 20 which sandwich the membrane electrode assembly 18 from the outside of the electrodes. Gas channels 21 and 22 are provided at the boundary of the separator and the electrode. In general, a laminate of a catalyst layer and a gas diffusion layer (stacked in order from the electrolyte membrane side) is used as the electrode. That is, the cathode electrode 16 includes a laminate of a cathode catalyst layer 12 and a gas diffusion layer 14, and the anode electrode 17 includes a laminate of an anode catalyst layer 13 and a gas diffusion layer 15. The carbon-supported catalyst of the present invention is used in at least one of the anode catalyst layer and the cathode catalyst layer.

The polyelectrolyte membrane is a polyelectrolyte membrane that is generally used in fuel cells. Examples thereof include fluorine-based polyelectrolyte membranes containing fluorine-based polyelectrolytes such as perfluorocarbon sulfonic acid resins typified by Nafion (trademark), and hydrocarbon-based polyelectrolyte membranes containing hydrocarbon-based polyelectrolytes obtained by incorporating a protonic acid group (proton conducting group) such as a sulfonic acid group, a carboxylic acid group, a phosphate group or a boronic acid group into a hydrocarbon-based polymer such as an engineering plastic (e.g., polyether ether ketone, polyether ketone, polyether sulfone, polyphenylene sulfide, polyphenylene ether, polyparaphenylene) or a commodity plastic (e.g., polyethylene, polypropylene, polystyrene).

The electrodes include a catalyst layer and a gas diffusion layer.

The anode catalyst layer and the cathode catalyst layer can be formed by use of a catalytic ink that contains a catalyst, an electroconductive material and a polyelectrolyte. As the polyelectrolyte, the same materials as those for the above-described polyelectrolyte membrane can be used. As the catalyst, the fine catalyst particles of the present invention are used.

The carbon-supported catalyst of the present invention can be used in the anode catalyst layer only, in the cathode catalyst layer only, or in both the anode and cathode catalyst layers. In the case of using the carbon-supported catalyst of the present invention in the anode catalyst layer only, a different catalyst is used in the cathode catalyst layer. In the case of using the carbon-supported catalyst of the present invention in the cathode catalyst layer only, a different catalyst is used in the anode catalyst layer.

As the different catalyst, generally, a catalytic component supported on electroconductive particles is used. The catalytic component is not particularly limited, as long as it has catalytic activity for oxidation reaction of a fuel supplied to the anode electrode or for reduction reaction of an oxidant supplied to the cathode electrode. As the catalytic component, there may be used those that are generally used in solid polymer type fuel cells. Examples thereof include platinum and alloys of platinum and metals such as ruthenium, iron, nickel, manganese, cobalt and copper. As the electroconductive particles, which serve as a catalyst support, there may be used electroconductive carbonaceous materials including carbon particles such as carbon black and carbon fibers, and metal materials including metal particles and metal fibers. The electroconductive material also functions to impart electroconductivity to the catalyst layer.

The method for forming the catalyst layer is not particularly limited. For example, the catalyst layer can be formed on a surface of a gas diffusion sheet by applying the catalytic ink to the sheet surface and drying the same, or the catalyst layer can be formed on a surface of the polyelectrolyte membrane by applying the catalytic ink to the membrane surface and drying the same. Or, the catalyst layer can be formed on a surface of the polyelectrolyte membrane or the gas diffusion sheet by the following method: the catalytic ink is applied to a surface of a transfer substrate and dried to produce a transfer sheet; the transfer sheet is attached to the polyelectrolyte membrane or the gas diffusion sheet by hot pressing, etc.; and the substrate film of the transfer sheet is removed therefrom.

The catalytic ink is obtained by dispersing the catalyst as described above and an electrolyte for electrodes in a solvent. The solvent of the catalytic ink can be appropriately selected, and there may be used alcohols such as methanol, ethanol and propanol, organic solvents such as N-methyl-2-pyrrolidone (NMP) and dimethyl sulfoxide (DMSO), mixtures of such organic solvents and mixtures of water and such organic solvents. In addition to the catalyst and the electrolyte, the catalytic ink can contain other components such as a binder and a water-repellent resin, as needed.

The method for applying the catalytic ink and the method for drying the same can be appropriately selected. Examples of the method for applying the catalytic ink include a spraying method, a screen printing method, a doctor blade method, a gravure printing method and a die coating method. Examples of the method for drying the catalytic ink include drying under reduced pressure, heat drying, and heat drying under reduced pressure. The condition of drying under reduced pressure or the condition of heat drying is not particularly limited and can be appropriately determined. The thickness of the catalyst layer is not particularly limited and can be about 1 to 50 µm.

As the gas diffusion sheet for forming the gas diffusion layer, it is preferable to employ one with gas diffusivity which enables efficient fuel supply to the catalyst layer, electroconductivity, and strength which is required of the material constituting the gas diffusion layer. Examples of the gas diffusion sheet used include those made of electroconductive porous materials such as carbonaceous porous materials and metallic porous materials or metallic mesh, the carbonaceous porous materials including carbon paper, carbon cloth and carbon felt, and the metallic porous materials or metallic mesh including those made of metals such as titanium, aluminum, aluminum alloy, nickel, nickel-chromium alloy, copper, copper alloy, silver, zinc alloy, lead alloy, niobium, tantalum, iron, stainless steel, gold and platinum. The thickness of the electroconductive porous materials is preferably about 50 to 500 µm.

The gas diffusion sheet can be a single layer made of the electroconductive porous material mentioned above. A water-repellent layer can be provided on the catalyst layer-facing side of the single layer. In general, the water-repellent layer has a porous structure that contains an electroconductive powder and granular material such as carbon particles or carbon fibers, a water-repellent resin such as polytetrafluoroethylene (PTFE), etc. The water-repellent layer is not a necessity. However, it is advantageous in that the drainage property of the gas diffusion layer can be increased, with maintaining the liquid water amount in the catalyst layer and the polyelectrolyte membrane at an appropriate level; moreover, electrical contact between the gas diffusion layer and the catalyst layer can be improved.

The polyelectrolyte membrane having the catalyst layer formed thereon by the above method and the gas diffusion sheet are appropriately stacked and attached to each other by hot pressing, etc., thus obtaining the membrane electrode assembly.

It is preferable that the membrane electrode assembly thus produced is sandwiched between separators having reaction gas channels to form a fuel cell. As the separator, one having electroconductivity and gas sealing properties and being able to function as a current collector and gas sealer can be used, such as a carbon separator being made of a composite material of resin and carbon fibers and containing a high concentration of carbon fibers, or a metallic separator made of a metal material. Example of the metallic separator include a metallic separator made of a metal material with excellent corrosion resistance and such a metallic separator that the surface is covered with carbon or a metal material with excellent corrosion resistance to apply a coating for increasing corrosion resistance. The reaction gas channels can be formed by appropriate compression molding or cutting of the separator.

EXAMPLE

Hereinafter, the present invention will be described in more detail, by way of examples and comparative examples. However, the present invention is not limited to these examples.

1. Production of Carbon-Supported Catalyst

Example 1

Oxide Removal Step

First, 1 g of palladium-supported carbon (Pd/C) in which palladium particles are supported on carbon particles, was put in a reaction container. Then, 1.0 L of a 0.05 M sulfuric acid aqueous solution was added thereto, and the Pd/C was suspended.

Next, a working electrode (glassy carbon), a counter electrode (platinum mesh) and a reference electrode (silver-silver chloride) were placed in the reaction container so that they were immersed in the sulfuric acid aqueous solution.

The reaction container was hermetically closed. The sulfuric acid aqueous solution in which the Pd/C was suspended, was subjected to nitrogen gas bubbling for 180 minutes, thereby removing oxygen from the aqueous solution.

Next, a potentiostat was connected to the working electrode, the counter electrode and the reference electrode, and 2,500 cycles of applying a potential in a square wave signal pattern (holding 0.05 V (vs. RHE) for 15 seconds and holding 1.2 V (vs. RHE) for 15 seconds were considered as one cycle) were carried out on the working electrode, thereby removing impurities and oxides present on the palladium particle surface. The potential of the silver-silver chloride electrode was converted to RHE and mentioned below.

In the oxide removal step, the temperature inside the reaction system was kept at 5° C.

(Copper Deposition Step)

With bubbling nitrogen into the sulfuric acid aqueous solution in the reaction container, copper sulfate pentahydrate was added in the reaction container so as to reach a copper ion concentration of 0.05 mol/L. Then, the potential of the working electrode was fixed at 0.35 V (vs. RHE) to deposit copper on the palladium particles. The potential was kept applied until the reaction current became steady and close to zero.

In the copper deposition step, the temperature inside the reaction system was kept at 5° C.

(Substitution Step)

The potential control was stopped, and 440 mg of $K_2PtCl_4$ and 1.5 g of citric acid, which is a complex forming agent serving as a reaction inhibitor, were dissolved in 100 mL of the 0.05 M sulfuric acid aqueous solution from which oxygen was removed. A platinum-containing solution thus obtained was gradually added in the reaction container. After the addition was completed, the mixture was kept stirred until the self-potential inside the reaction container reaches a plateau (that is, until the self-potential shows no change), thereby substituting the copper on the palladium particle surface with the platinum. In the substitution step, the amount of the platinum deposited was 135% with respect to the geometric surface area of the palladium.

In the substitution step, the temperature inside the reaction system was kept at 5° C., using a circulation cooling device (chiller).

(Washing Step)

After the substitution step, the solution in the reaction container was filtered, and a solid thus obtained was washed with 4 L of, pure water.

The solid washed with pure water was put in 1 L of pure water. The solid was sufficiently dispersed in the pure water with a ultrasonic homogenizer. Then, with stirring the dispersion, the temperature of the dispersion was increased to 60° C. Next, 40 mL of the supernatant solution of the dispersion was collected, filtered using a syringe with a filter, and then measured for conductivity under the following conditions:

Measurement device: Conductivity Meter AOL-40 (manufactured by DKK)

Measurement temperature: 25° C.

In the case where the conductivity of the supernatant solution was more than 10 µS/cm, the dispersion was filtered, and a solid thus obtained was put in 1 L of pure water again, and the warm water washing was repeated. On the other hand, in the case where the conductivity of the washing water was 10 µS/cm or less, the dispersion was filtered to obtain a catalyst cake.

(Acid Treatment Step)

After the warm water washing, the catalyst cake was put in pure water and dispersed with a ultrasonic homogenizer. Then, nitric acid was added thereto, thereby preparing a 1 mol/L nitric acid dispersion. The nitric acid dispersion was prepared so that the solid content concentration of the dispersion reaches of 1 g/mL. The nitric acid dispersion was stirred for minutes at 50° C. Then, the nitric acid dispersion was filtered, and a solid thus obtained was repeatedly washed with pure water until the filtrate becomes neutral.

(Drying Step)

A catalyst cake thus obtained was dried under reduced pressure at 60° C. for 8 hours or more, thereby obtaining the carbon-supported catalyst of Example 1.

Example 2

The carbon-supported catalyst of Example 2 was produced in the same manner as Example 1, except that in the substitution step, the amount of the $K_2PtCl_4$ added was adjusted so that the amount of the platinum deposited is 110% with respect to the geometric surface area of the palladium.

Example 3

The carbon-supported catalyst of Example 3 was produced in the same manner as Example 1, except that in the substitution step, the amount of the $K_2PtCl_4$ added was adjusted so that the amount of the platinum deposited is 120% with respect to the geometric surface area of the palladium.

Examples 4 and 5

The carbon-supported catalysts of Examples 4 and 5 were produced in the same manner as Example 1, except that in the substitution step, the amount of the $K_2PtCl_4$ added was adjusted so that the amount of the platinum deposited is 100% with respect to the geometric surface area of the palladium.

Comparative Example 1

The carbon-supported catalyst of Comparative Example 1 was produced in the same manner as Example 1, except the following: in the oxide removal step, the range of the potential in the square wave signal pattern was changed from a range of 0.05 V to 1.2 V (vs. RHE) to a range of 0.4 V to 0.45 V (vs. RHE); the temperature of the copper deposition step and that of the substitution step were changed from 5° C. to 25° C. (room temperature); and in the substitution step, the amount of the $K_2PtCl_4$ added was adjusted so that the amount of the platinum deposited is 100% with respect to the geometric surface area of the palladium.

Comparative Example 2

The carbon-supported catalyst of Comparative Example 2 was produced in the same manner as Example 1, except that the copper deposition step and the substitution step were alternately repeated two times, and in the second substitution step, the amount of the $K_2PtCl_4$ added was adjusted so that the platinum deposited is 220% with respect to the geometric surface of the palladium.

Comparative Example 3

The carbon-supported catalyst of Comparative Example 3 was produced in the same manner as Example 1, except that in the oxide removal step, the temperature inside the reaction system was changed from 5° C. to 50° C., and in the substitution step, the amount of the $K_2PtCl_4$ added was adjusted so that the amount of the platinum deposited is 100% with respect to the geometric surface area of the palladium.

Comparative Example 4

The carbon-supported catalyst of Comparative Example 4 was produced in the same manner as Example 4, except that in the substitution step, the acid treatment step was not carried out.

Comparative Examples 5 and 6

The carbon-supported catalysts of Comparative Examples 5 and 6 were produced in the same manner as Example 1, except that in the substitution step, the amount of the $K_2PtCl_4$ added was adjusted so that the amount of the platinum deposited is 90% with respect to the geometric surface area of the palladium.

The following Table 1 shows differences in production condition between the carbon-supported catalysts of Examples 1 to 5 and Comparative Examples 1 to 6.

TABLE 1

| | Oxide removal step | | Copper deposition step | Substitution step | | |
|---|---|---|---|---|---|---|
| | Potential (V) | Temperature (° C.) | Temperature (° C.) | Temperature (° C.) | Amount of platinum added (%) | Acid treatment |
| Example 1 | 0.05 to 1.2 | 5 | 5 | 5 | 135 | Yes |
| Example 2 | 0.05 to 1.2 | 5 | 5 | 5 | 110 | Yes |
| Example 3 | 0.05 to 1.2 | 5 | 5 | 5 | 120 | Yes |
| Example 4 | 0.05 to 1.2 | 5 | 5 | 5 | 100 | Yes |
| Example 5 | 0.05 to 1.2 | 5 | 5 | 5 | 100 | Yes |
| Comparative Example 1 | 0.4 to 0.45 | 5 | 25 | 25 | 100 | Yes |
| Comparative Example 2 | 0.05 to 1.2 | 5 | 5 | 5 | 220 | Yes |
| Comparative Example 3 | 0.05 to 1.2 | 50 | 5 | 5 | 100 | Yes |
| Comparative Example 4 | 0.05 to 1.2 | 5 | 5 | 5 | 100 | No |
| Comparative Example 5 | 0.05 to 1.2 | 5 | 5 | 5 | 90 | Yes |
| Comparative Example 6 | 0.05 to 1.2 | 5 | 5 | 5 | 90 | Yes |

2. Evaluation of Carbon-Supported Catalyst

Hereinafter, (1) RDE evaluation, (2) RDE activity (MA) measurement, (3) inductively coupled plasma mass spectrometry (ICP-MS) measurement, (4) electrochemical surface area (ECSA) measurement, and (5) MEA activity (MA) measurement were carried out on the carbon-supported catalysts of Examples 1 to 5 and Comparative Examples 1 to 6.

(1) RDE Evaluation

First, 30 mg of the carbon-supported catalyst sample was added to a mixed solution of 130 μL of a 5% Nafion (trademark) dispersion ("DE521" manufactured by DuPont), 30 mL of pure water, and 7.5 mL of 2-propanol. The mixture was subjected to a dispersion treatment for 16 minutes with a homogenizer, thereby producing a catalyst ink. Next, 10 μL of the catalyst ink was applied onto the glassy carbon electrode of a rotating disk electrode (RDE) (manufactured by Hokuto Denko Corporation) and dried.

In a 0.1 M perchloric acid aqueous solution subjected to argon bubbling in advance, cyclic voltammetry was carried out. The conditions of the cyclic voltammetry are as follows. For area calculation, the second cycle of the cyclic voltammogram was used.

Electrolyte: 0.1 M perchloric acid aqueous solution (saturated with argon in advance)
Atmosphere: Under argon atmosphere
Sweep rate: 50 (mV/sec)
Potential sweep range: −0.05 to 1.0 (V vs. RHE)
Number of cycles: 2

FIGS. 1 to 5 and 12 to 15 are graphs showing the reduction current region of the CV of the carbon-supported catalyst of each of Examples 1 to 5 and Comparative Examples 1, 2, 5 and 6, respectively, and a hydrogen adsorption region and a hydrogen occlusion region in the reduction current region. In the reduction current region, the sweep direction is a direction from the high potential side to the low potential side of each figure. In these figures, a rhombus (◇) indicates a part at which hydrogen adsorption starts; a white triangle (Δ) indicates a part at which hydrogen adsorption ends and hydrogen occlusion starts; and a black triangle (▲) indicates a part at which hydrogen occlusion ends and a region where protons are reduced to produce hydrogen starts.

The area of the hydrogen adsorption region was obtained as follows. First, the current value from the start point (◇ in the figures) to the end point (Δ in the figures) of the hydrogen adsorption region was integrated with respect potential. Next, the electric double layer capacitance of the potential range was subtracted from the resulting integral value (electrical quantity) and the resulting value was considered as the area of the hydrogen adsorption region. In FIGS. 1 to 5 and 12 to 15, the area of the hydrogen adsorption region is shown as a cross-hatched region.

Meanwhile, the area of the hydrogen occlusion region was obtained as follows. First, the current value from the start point (Δ in the figures) to the end point (▲ in the figures) of the hydrogen occlusion region was integrated with respect to potential. Next, the electric double layer capacitance of the potential range was subtracted from the resulting integral value (electrical quantity) and the resulting value was considered as the area of the hydrogen occlusion region. In FIGS. 1 to 5 and 12 to 15, the area of the hydrogen occlusion region is shown as a hatched region. In these figures, the electric double layer capacitance is shown as vertical stripes.

The area proportion of the hydrogen adsorption region was obtained by the following formula (1) and used as the indicator of the RDE evaluation.

The area proportion (%) of the hydrogen adsorption region={(the area of the hydrogen adsorption region)/(the area of the hydrogen adsorption region+the area of the hydrogen occlusion region)}×100    [Formula (1)]

(2) RDE Activity (MA) Measurement

Oxygen reduction reaction (ORR) measurement was carried out using the same electrode as the above "(1) RDE evaluation". The ORR measurement conditions are as follows.

Electrolyte: 0.1 M perchloric acid aqueous solution (saturated with oxygen in advance)
Atmosphere: Under oxygen atmosphere
Sweep rate: 10 (mV/sec)
Potential sweep range: 0.1 to 1.05 V (vs. RHE)
Rotational frequency of rotating disk electrode: 1,600 rpm An oxygen reduction wave was obtained by the ORR measurement. From the oxygen reduction wave, the catalytic activity (MA) per unit mass of the platinum in the carbon-supported catalyst was measured.

The catalytic activity per unit mass of the platinum in the carbon-supported catalyst is measured as follows: for the oxygen reduction wave obtained by the ORR measurement, the current value at 0.9 V (vs. RHE) of the second cycle was considered as oxygen reduction current ($I_{0.9}$) and the current value at 0.4 V (vs. RHE) of the second cycle was considered as diffusion limited current ($I_{lim}$); an activation controlled current (Ik) was obtained by the following formula (2); and the Ik (A) was divided by the amount (g) of the platinum contained in the carbon-supported catalyst applied onto the glassy carbon electrode, thereby measuring the catalytic activity (A/g-Pt) per unit mass of the platinum.

$$Ik = (I_{lim} \times I_{0.9})/(I_{lim} - I_{0.9}) \quad \text{[Formula (2)]}$$

In the formula (2), the meanings of the symbols are as follows:

Ik: Activation controlled current (A)
$I_{lim}$: Diffusion limited current (A)
$I_{0.9}$: Oxygen reduction current (A)

RDE activities are shown in Table 2 mentioned below, which are values subjected to limiting current correction.

(3) Inductively Coupled Plasma Mass Spectrometry (ICP-MS) Measurement

For the carbon-supported catalyst, the platinum amount and the palladium amount on the fine catalyst particle surface were quantitated by ICP-MS, and the coverage was calculated as follows. First, the outermost layer metal content (A) in the fine catalyst particle was measured by ICP-MS. Also, the average particle diameter of the fine catalyst particles was measured with a transmission electron microscope (TEM). From the average particle diameter measured, the number of atoms on the surface of a particle having the same particle diameter was estimated, and the outermost layer metal content (B) in the case where one atomic layer on the particle surface is substituted with the metal contained in the platinum-containing outermost layer, was estimated. The outermost layer metal content (A) was divided by the outermost layer metal content (B), and the resulting value was used as the coverage of the fine catalyst particle surface (the coverage of the palladium-containing particle with the platinum-containing outermost layer).

(4) Electrochemical Surface Area (ECSA) Measurement

A hydrogen adsorption charge amount was calculated from a cyclic voltammogram waveform (CV waveform)

obtained in the 0.1 M perchloric acid aqueous solution saturated with argon. The hydrogen adsorption charge amount was calculated by subtracting the charge amount of the double layer from a hydrogen adsorption waveform in a range of 0.40 to 0.07 V for the reduction wave in the CV waveform. The hydrogen adsorption charge amount was divided by a theoretical coefficient (210 μC/cm$^2$), thereby obtaining the surface area of the fine catalyst particles in the carbon-supported catalyst.

An ECSA was calculated by dividing the surface area of the fine catalyst particles by the mass of the platinum on the RDE (the following formula (3)). The mass of the platinum on the RDE was calculated from the amount of the fine catalyst particles applied to the RDE and the platinum support rate in the fine catalyst particle obtained by ICP analysis.

(ECSA)=(the surface area of the fine catalyst particles)/(the mass of the platinum on the RDE)= {(the hydrogen adsorption charge amount)/(210 μC/cm$^2$)}/(the mass of the platinum on the RDE)     [Equation (3)]

(5) MEA Activity (MA) Measurement

A membrane electrode assembly (MEA) was produced using each carbon-supported catalyst. The catalytic activity of each carbon-supported catalyst was evaluated by measuring the cell voltage of each MEA.

(a) Production of MEA

First, 0.9 g of each carbon-supported catalyst and 14.24 g of water were sufficiently mixed by centrifugal stirring. Next, 8.16 g of ethanol was added to the mixture, and the mixture was uniformly mixed also by centrifugal stirring. In addition, 1.9 g of an electrolyte (product name: DE2020CS, manufactured by: DuPont) was added to the mixture, and the mixture was uniformly mixed also by centrifugal stirring, thereby obtaining a catalyst ink raw material.

Under a dry atmosphere, 20 mL of the catalyst ink raw material and 60 g of PTFE grinding balls (diameter 2.4 mm) were put in a PTFE pot. The pot was hermetically closed, installed in a planetary ball mill, and subjected to mechanical milling under the conditions of a plate rotational frequency of 600 rpm, a temperature of 20° C., and a treatment time of one hour. After the mechanical milling was completed, the mixture in the container was filtered with a mesh to remove the balls from the mixture, thereby obtaining a catalyst ink.

The catalyst ink was filled into a spray gun (product name: Spectrum S-920N, manufactured by: Nordson) and applied to one side (cathode side) of an electrolyte membrane (product name: NR211, manufactured by: DuPont) in a catalyst amount of 300 to 500 μg/cm$^2$. An ink was produced in the same manner as the cathode side and applied to the other side (anode side) of the electrolyte membrane, except that a commercially-available platinum-supported carbon (manufactured by Tanaka Kikinzoku Kogyo K. K.) was used and the platinum amount per electrode area was set to 0.1 mg. A membrane electrode assembly having an electrode area of 1 cm$^2$ was obtained in this manner.

Hereinafter, for ease of description, the membrane electrode assemblies using the carbon-supported catalysts of Examples 1 to 5 and Comparative Examples 1 to 6 as a raw material, may be referred to as membrane electrode assemblies of Examples 1 to 5 and Comparative Examples 1 to 6.

(b) IV Evaluation Using MEA

IV evaluation was carried out on the membrane electrode assemblies of Examples 1 to 5 and Comparative Examples 1 to 6 in the following conditions.

Fuel gas: Hydrogen gas (flow rate: 0.5 L/min, 50 kPa-G)
Oxidant gas: Air (flow rate: 2.0 L/min, 50 kPa-G)
Temperature: 60° C.
Anode/cathode dew point: 55° C.
Humidity: 80%

The measurement method is as follows. First, after holding a voltage of 0.2 V or less, at which the fine catalyst particle surface enters a reduction state, for several hours, the potential was increased to 0.1 V, 0.2 V, 0.3 V . . . and finally to 0.9 V, in increments of 0.1 V, with being held for 3 minutes at each point. The current density (A/cm$^2$) at 0.88 V was read, and the current density was divided by the amount of the platinum present on the cathode-side electrode surface, thereby calculating the mass activity (MA) of the MEA ([A/g-Pt]@0.88 V). MEA activities are shown in the following Table 2, which are values not subjected to limiting current correction.

The following Table 2 shows the results of the above-described five evaluations for the carbon-supported catalysts of Examples 1 to 5 and Comparative Examples 1 to 6. In Table 2, "Activity ratio (%)" means a value obtained by dividing the MEA activity value by the RDE activity value and multiplying the resulting value by 100. As the activity ratio value increases, the activity expected from the RDE activity is likely to be maintained even after the MEA formation.

TABLE 2

| | Area proportion (%) of hydrogen adsorption region | MEA activity (MA) [A/g-Pt]@0.88 V | RDE activity (MA) [A/g-Pt]@0.9 V | Activity ratio (%) | ICP composition Pt | Pd | Pt/Pd | Coverage (%) | ECSA [m$^2$/g-Pt] |
|---|---|---|---|---|---|---|---|---|---|
| Example 1 | 33.8 | 171 | 620 | 27.6 | 18 | 19.8 | 0.91 | 107 | 120 |
| Example 2 | 31.8 | 186 | 650 | 28.6 | 17 | 20.2 | 0.84 | 98.8 | 124 |
| Example 3 | 31.8 | 143 | 630 | 22.7 | 17.5 | 20 | 0.88 | 104 | 122 |
| Example 4 | 29.8 | 129 | 680 | 19.0 | 16 | 21 | 0.76 | 89.4 | 145 |
| Example 5 | 29.4 | 129 | 680 | 19.0 | 16.5 | 20.7 | 0.8 | 94.1 | 145 |
| Comparative Example 1 | 26.2 | 42.9 | 450 | 9.53 | 17.2 | 21.5 | 0.8 | 94.1 | 140 |
| Comparative Example 2 | 38.2 | 82 | 420 | 19.5 | 31.4 | 17.7 | 1.8 | 212 | 85 |
| Comparative Example 3 | 24.0 | 43 | 1150 | 3.74 | 12.0 | 16.8 | 0.71 | 83.5 | 95 |
| Comparative Example 4 | 25.3 | 45 | 580 | 7.76 | 15.8 | 21.8 | 0.72 | 84.7 | 150 |

TABLE 2-continued

| | Area proportion | | | Activity | ICP composition | | | Coverage (%) | ECSA [m²/g-Pt] |
|---|---|---|---|---|---|---|---|---|---|
| | (%) of hydrogen adsorption region | MEA activity (MA) [A/g-Pt]@0.88 V | RDE activity (MA) [A/g-Pt]@0.9 V | ratio (%) | Pt | Pd | Pt/ Pd | | |
| Comparative Example 5 | 28.3 | 100 | 720 | 13.9 | 14.5 | 22 | 0.66 | 77.6 | 155 |
| Comparative Example 6 | 28.3 | 85.7 | 700 | 12.2 | 14.3 | 22.6 | 0.63 | 74.1 | 152 |

Hereinafter, the examples and comparative examples will be discussed by reference to Tables 1 and 2.

First, Comparative Example 1 will be discussed. According to Table 1, the carbon-supported catalyst of Comparative Example 1 is a catalyst produced by narrowing the potential sweep range in the oxide removal step to a range of 0.4 V to 0.45 V (vs. RHE) and carrying out both the copper deposition step and the substitution step under room temperature.

According to Table 2, the area proportion of the hydrogen adsorption region of Comparative Example 1 is 26.2% and low. Meanwhile, the coverage of Comparative Example 1 obtained from the ICP composition ratio is 94.1% and high. Also, the ECSA value of Comparative Example 1 is 140 (m²/g-Pt) and is relatively high among the samples used in the above experiments.

However, the activity ratio of Comparative Example 1 is 9.53% and low. It is considered that this is because, since the potential sweep range in the oxide removal step was too narrow and the copper deposition and the platinum substitution were carried out at a temperature that is too high, the platinum-containing outermost layer-covered state of the fine catalyst particle surface became poor and, as a result, the area proportion of the hydrogen adsorption region became less than 29%.

Next, Comparative Example 2 will be discussed. The carbon-supported catalyst of Comparative Example 2 is a catalyst produced by alternately repeating the copper deposition step and the substitution step two times.

According to Table 2, the area proportion of the hydrogen adsorption region of Comparative Example 2 is 38.2% and high. The coverage of Comparative Example 1 obtained from the ICP composition ratio is 212% and high. The activity ratio of Comparative Example 2 is 19.5%, and it does not seem to be particularly problematic.

However, the ECSA value of Comparative Example 2 is 85 (m²/g-Pt) and is the smallest among the samples used in the above experiments. It is considered that this is because, since two or more platinum layers were deposited on the palladium surface, the platinum surface area used for catalytic reaction per mass decreased.

Next, Comparative Example 3 will be discussed. According to Table 1, the carbon-supported catalyst of Comparative Example 3 is a catalyst produced by carrying out the oxide removal step under a temperature condition of 50° C.

According to Table 2, the area proportion of the hydrogen adsorption region of Comparative Example 3 is 24.0% and low. Meanwhile, the coverage of Comparative Example 3 obtained from the ICP composition ratio is 83.5%. The ECSA value of Comparative Example 3 is 95 (m²/g-Pt) and is relatively small among the samples used in the above experiments.

However, the activity ratio of Comparative Example 3 is 3.74% and is the smallest among the samples used in the above experiments. It is considered that this is because, since the oxide removal step was carried out at a relatively high temperature, impurities on the palladium surface increased and, as a result, the area proportion of the hydrogen adsorption region became less than 29%.

Next, Comparative Example 4 will be discussed. According to Table 1, the carbon-supported catalyst of Comparative Example 4 is a catalyst produced without the acid treatment step.

According to Table 2, the area proportion of the hydrogen adsorption region of Comparative Example 4 is 25.3% and low. Meanwhile, the coverage of Comparative Example 4 obtained from the ICP composition ratio is 84.7%. The ECSA value of Comparative Example 4 is 150 (m²/g-Pt) and is relatively large among the samples used in the above experiments.

However, the activity ratio of Comparative Example 4 is 7.76% and small. It is considered that this is because, since the acid treatment was omitted, many impurities remained on the carbon-supported catalyst surface and, as a result, the area proportion of the hydrogen adsorption region became less than 29%.

Next, Comparative Examples 5 and 6 will be discussed. According to Table 1, these carbon-supported catalysts were catalysts produced by, in the substitution step, adjusting the platinum amount added to 90% with respect to the geometric surface area of the palladium.

According to Table 2, the area proportions of the hydrogen adsorption regions of Comparative Examples 5 and 6 are both 28.3% and low. Meanwhile, the coverages of Comparative Examples 5 and 6 obtained from the ICP composition ratios are 77.6% and 74.1%, respectively, and they are the lowest results among the samples used in the above experiments. Although Comparative Examples 5 and 6 include such the lowest results, the ECSA values of Comparative Examples 5 and 6 are 155 (m²/g-Pt) and 152 (m²/g-Pt), respectively, and they are the largest results among the samples used in the above experiments.

However, the activity ratios of Comparative Examples 5 and 6 are 13.9% and 12.2%, respectively, and they are small. It is considered that this is because the amount of the platinum used for the substitution was too small and, as a result, the area proportions of the hydrogen adsorption regions of Comparative Examples 5 and 6 became less than 29%.

Figure 6:
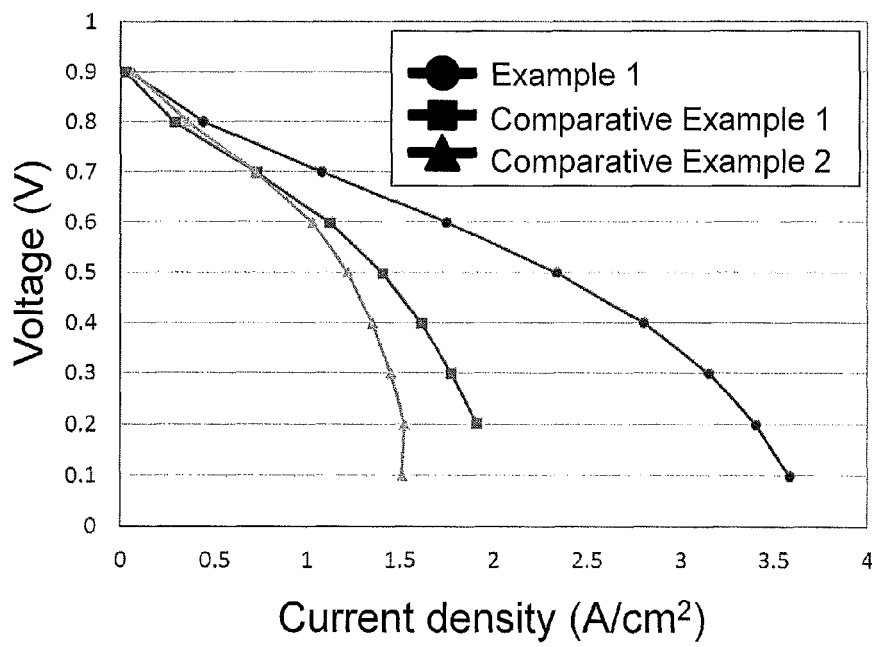
FIG. 6 is a graph showing the I-V curves of Example 1 and Comparative Examples 1 and 2, which are overlapped with each other.

FIG. 6 is a graph showing the I-V curves of Example 1 and Comparative Examples 1 and 2, which are overlapped with each other. FIG. 6 is a graph with voltage (V) on the vertical axis and current density (A/cm²) on the horizontal axis. In FIG. 6, circle plots indicate the data of Example 1; square plots indicate the data of Comparative Example 1; and triangle plots indicate the data of Comparative Example 2.

As is clear from FIG. 6, the carbon-supported catalyst of Example 1 shows higher voltage than the carbon-supported catalysts of Comparative Examples 1 and 2, almost all over the current density range. Particularly, the difference is remarkable under the high current density condition. For example, under the condition of a current density of 1.5 (A/cm$^2$), the voltage of Comparative Example 1 is 0.45 V and that of Comparative Example 2 is 0.1 V; meanwhile, the voltage of Example 1 is 0.65 V and higher. Under the condition of a current density of 2 (A/cm$^2$), the voltage of Comparative Example 1 is 0.2 V; meanwhile, the voltage of Example 1 is 0.58 V and higher.

The reason why, as just described, Example 1 is better than Comparative Example 1 in I-V characteristics is considered as follows: the area proportion of the hydrogen adsorption region was adjusted to 29% or more by taking a sufficiently wide potential sweep range in the oxide removal step, carrying out the copper deposition and the platinum substitution under low temperature, and appropriately increasing the added platinum amount used for the platinum substitution.

Also, the reason why Example 1 is better than Comparative Example 2 in I-V characteristics is considered as follows: the area proportion was adjusted to 36% or less by carrying out the copper deposition step and the substitution step one time each and adjusting the platinum amount used for the substitution to an appropriate amount.

Figure 16:
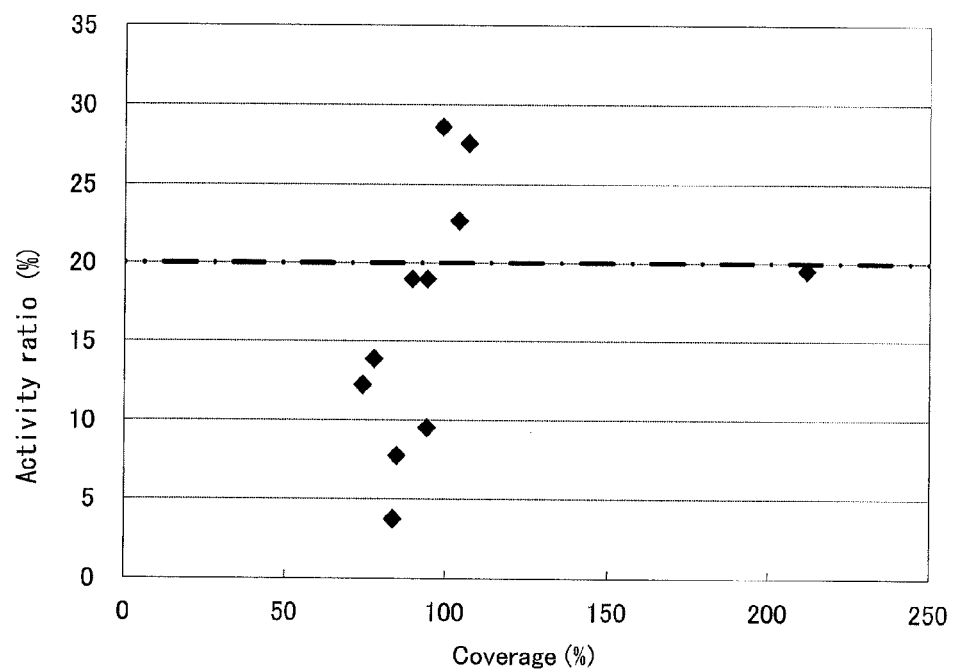
FIG. 16 is a graph showing a relationship between coverage and activity ratio, for Examples 1 to 5 and Comparative Examples 1 to 6.

FIG. 16 is a graph showing a relationship between the coverage of the fine catalyst particle and the activity ratio for Examples 1 to 5 and Comparative Examples 1 to 6. An alternate long and short dash line (activity ratio=20%) in FIG. 16 indicates the activity ratio which is considered to be required from the viewpoint of practical application.

From FIG. 16, it is clear that the carbon-supported catalysts having a wide range of activity ratios (3 to 30%) are distributed in a range of the coverage of the fine catalyst particle of 75 to 110%. From FIG. 16, it is not clear that why Example 2 (coverage 98.8%, activity ratio 28.6%), Example 5 (coverage 94.1%, activity ratio 19.0%) and Comparative Example 1 (coverage 94.1%, activity ratio 9.53%) vary in activity ratio, although their coverages are close to each other.

From the above, it is clear that the coverage of the fine catalyst particle does not serve as an indicator for predicting the MEA activity based on the RDE activity.

Figure 7:
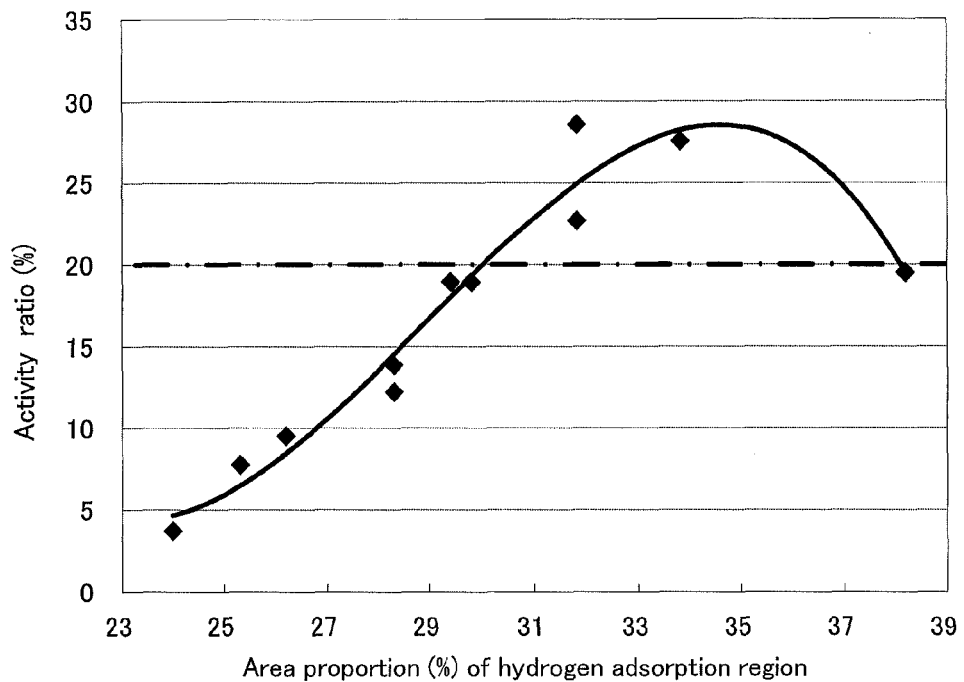
FIG. 7 is a graph showing a relationship between activity ratio and the proportion of the area of the hydrogen adsorption region, for Examples 1 to 5 and Comparative Examples 1 to 6.

FIG. 7 is a graph showing a relationship between the activity ratio and the area proportion of the hydrogen adsorption region, for Examples 1 to 5 and Comparative Examples 1 to 6. An alternate long and short dash line in FIG. 7 is the same as FIG. 16.

In FIG. 7, as shown by a fitted curve, it is clear that the activity ratio which is similar to or more than the activity ratio (20%) that is considered to be required from the viewpoint of practical application, is obtained in a range of the area proportion of the hydrogen adsorption region of 29% to 36%.

The reason why the activity ratio is low in the case where the area proportion of the hydrogen adsorption region is less than 29% (Comparative Examples 1 and 3 to 6) is as follows. That the area proportion of the hydrogen adsorption region is too low indicates that the fine catalyst particle surface is not absolutely covered with the platinum-containing outermost layer or there is space between the platinum particles on the fine catalyst particle surface, so that the amount of the palladium exposed on the fine catalyst particle surface is too large. In the case where the amount of the palladium is too large, it is considered that especially the MEA activity is decreased due to the presence of the palladium, compared to an ideal carbon-supported catalyst in which the whole surface of the fine catalyst particle is covered with a platinum monoatomic layer.

Figure 8:
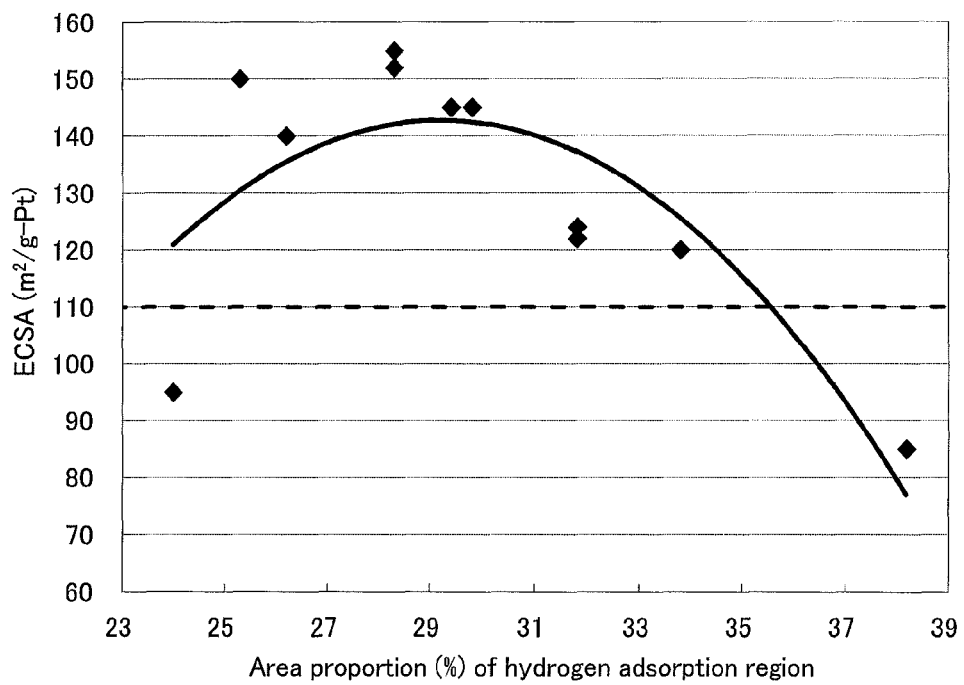
FIG. 8 is a graph showing a relationship between ECSA and the proportion of the area of the hydrogen adsorption region, for Examples 1 to 5 and Comparative Examples 1 to 6.

FIG. 8 is a graph showing a relationship between the ECSA and the area proportion of the hydrogen adsorption region, for Examples 1 to 5 and Comparative Examples 1 to 6. A dashed line (ECSA=110 (m$^2$/g-Pt)) in FIG. 8 indicates the lower limit of the ECSA, which is considered to be required from the viewpoint of practical application.

In FIG. 8, as shown by a fitted curve, it is clear that the ECSA (110 (m$^2$/g-Pt)) which is considered to be required from the viewpoint of practical application, is not obtained in the case where the area proportion of the hydrogen adsorption region is more than 36%.

The reason why the ECSA is low in the case where the area proportion of the hydrogen adsorption region is more than 36% (Comparative Example 2) is as follows. That the area proportion of the hydrogen adsorption region is too low indicates that the platinum-containing outermost layer is too thick and the amount of the platinum present in the vicinity of the fine catalyst particle surface is too large. In the case where the amount of the platinum is too large, the platinum inside the fine catalyst particle cannot involve in catalytic reaction, so that the platinum surface area per mass decreases and, as a result, it is considered that the ECSA decreases.

Compared to the results of Comparative Examples 1 to 6, in the case where the area proportion of the hydrogen adsorption region is 29% or more (Examples 1 to 5), it means that the fine catalyst particle surface is sufficiently covered with the platinum monoatomic layer, and the platinum atoms in the platinum monoatomic layer are densely arranged, so that the amount of the palladium exposed on the fine catalyst particle surface is minimized. As just described, due to having the structure in which the palladium is trapped by the platinum monoatomic layer, it is considered that not only the RDE activity is increased higher than ever before, but also the catalytic activity is maintained even after the MEA formation. In the case where the area proportion of the hydrogen adsorption region is 36% or less (Examples 1 to 5), the ECSA can be kept sufficiently high.

In addition, as is clear from FIG. 7, in the case where the area proportion of the hydrogen adsorption region is in a range of 30% to 36% (Examples 1 to 3), the activity ratio is more than the activity ratio (20%) which is considered to be required from the viewpoint of practical application. Therefore, it is clear that in a range of the area proportion of the hydrogen adsorption region of 30% to 36%, the catalyst is better than conventional catalysts in terms of practical application.

From the above, it is clear that the area proportion of the hydrogen adsorption region is a physical value that authentically reflects the composition ratio of the platinum and the palladium in the vicinity of the fine catalyst particle surface. Therefore, it is clear that the area proportion of the hydrogen adsorption region is a value that can be relatively easily measured even for the carbon-supported catalyst; moreover, in contrast to the above-described coverage, the area proportion of the hydrogen adsorption region is an excellent indicator to predict the MEA activity based on the RDE activity.

REFERENCE SIGNS LIST

1. Glass cell
2. Electrolyte
3. Dispersion

4. Working electrode
5. Reference electrode
6. Counter electrode
7. Gas inlet tube
8. Bubbles
11. Polyelectrolyte membrane
12. Cathode catalyst layer
13. Anode catalyst layer
14, 15. Gas diffusion layer
16. Cathode electrode
17. Anode electrode
18. Membrane electrode assembly
19, 20. Separator
21, 22. Gas channel
100. Electrochemical device
200. Fuel cell

The invention claimed is:

1. A carbon-supported catalyst,
wherein the carbon-supported catalyst comprises fine catalyst particles that have a palladium-containing particle and a platinum-containing outermost layer covering at least part of the palladium-containing particle, and a carbon support supporting the fine catalyst particles;
wherein, in a cyclic voltammogram that is obtained by measuring, in an acid solution, the carbon-supported catalyst applied to a measurement electrode made of an electroconductive material, a proportion of an area of a hydrogen adsorption region that appears in a reduction current region to a total area of the hydrogen adsorption region and a hydrogen occlusion region that appears in the reduction current region, is 29% to 36%; and
wherein the cyclic voltammogram is obtained by cyclic voltammetry under conditions that a sweep rate is 50 mV/s and the acid solution has a temperature of 25° C. and is a 0.1 M perchloric acid aqueous solution subjected to inert gas bubbling.

2. The carbon-supported catalyst according to claim 1, wherein the fine catalyst particles have an average particle diameter of 3 nm or more and 10 nm or less.

* * * * *